(12) United States Patent
Wang et al.

(10) Patent No.: US 9,914,793 B2
(45) Date of Patent: Mar. 13, 2018

(54) SPHEROIDAL CATALYST FOR OLEFIN POLYMERIZATION

(71) Applicant: NOVA Chemicals (International) S.A., Fribourg (CH)

(72) Inventors: Qinyan Wang, Calgary (CA); Tyler Craig, Vancouver (CA); Savina Udara Suduweli Kondage, Endeavour Hills (AU); Bradley Wade Funk, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 107 days.

(21) Appl. No.: 14/967,704

(22) Filed: Dec. 14, 2015

(65) Prior Publication Data

US 2016/0168289 A1 Jun. 16, 2016

(30) Foreign Application Priority Data

Dec. 15, 2014 (CA) ................................. 2874344

(51) Int. Cl.
| | | |
|---|---|---|
| *C08F 4/02* | (2006.01) | |
| *C08F 4/6592* | (2006.01) | |
| *C08F 210/16* | (2006.01) | |
| *C08F 4/649* | (2006.01) | |
| *C08F 4/659* | (2006.01) | |

(52) U.S. Cl.
CPC ............ *C08F 210/16* (2013.01); *C08F 4/022* (2013.01); *C08F 4/649* (2013.01); *C08F 4/65912* (2013.01); *C08F 4/65916* (2013.01); *C08F 2420/04* (2013.01)

(58) Field of Classification Search
CPC .. C08F 4/6592; C08F 4/65912; C08F 210/02; C08F 4/65916; C08F 210/16
See application file for complete search history.

(56) References Cited

U.S. PATENT DOCUMENTS

| | | | |
|---|---|---|---|
| 3,248,179 A | 4/1966 | Norwood | |
| 4,127,507 A | 11/1978 | Fannin et al. | |
| 4,250,288 A | 2/1981 | Lowery, Jr. et al. | |

(Continued)

FOREIGN PATENT DOCUMENTS

| | | |
|---|---|---|
| CA | 1189053 | 6/1985 |
| CA | 2036767 A1 | 9/1991 |

(Continued)

OTHER PUBLICATIONS

Clark, James H. and MacQuarrie, Duncan J.; Catalysts, Supported; Kirk-Othmer Encyclopedia of Chemical Technology, published online Nov. 15, 2002, Copyright 2001 by John Wiley & Sons, Inc.; pp. 1-37.

(Continued)

*Primary Examiner* — Caixia Lu
(74) *Attorney, Agent, or Firm* — Lawrence T. Kale

(57) ABSTRACT

A solid, spheroidal polymerization catalyst having a particle size distribution characterized by a Dm*/Dn of less than 3.0, the catalyst comprising a phosphinimine catalyst, a cocatalyst and a magnesium chloride support. A process for the polymerization of ethylene with one or more alpha olefin catalyzed by a solid, spheroidal polymerization catalyst having a particle size distribution characterized by a Dm*/Dn of less than 3.0, the catalyst comprising a phosphinimine catalyst, a cocatalyst and a magnesium chloride support.

16 Claims, 6 Drawing Sheets

MgCl₂ Particles (Prior to Ether Removal)

(56) References Cited

U.S. PATENT DOCUMENTS

| | | | |
|---|---|---|---|
| 4,325,849 | A | 4/1982 | Rosen et al. |
| 4,543,399 | A | 9/1985 | Jenkins, III et al. |
| 4,588,790 | A | 5/1986 | Jenkins, III et al. |
| 4,613,484 | A | 9/1986 | Ayres et al. |
| 5,026,795 | A | 6/1991 | Hogan |
| 5,028,670 | A | 6/1991 | Chinh et al. |
| 5,106,804 | A | 4/1992 | Bailly et al. |
| 5,283,278 | A | 2/1994 | Daire et al. |
| 5,317,036 | A | 5/1994 | Brady, III et al. |
| 5,352,749 | A | 10/1994 | DeChellis et al. |
| 5,405,922 | A | 4/1995 | DeChellis et al. |
| 5,434,116 | A | 7/1995 | Sone et al. |
| 5,436,304 | A | 7/1995 | Griffin et al. |
| 5,439,995 | A | 8/1995 | Bailly et al. |
| 5,453,471 | A | 9/1995 | Bernier et al. |
| 5,462,999 | A | 10/1995 | Griffin et al. |
| 5,554,775 | A | 9/1996 | Krishnamurti et al. |
| 5,616,661 | A | 4/1997 | Eisinger et al. |
| 5,637,659 | A | 6/1997 | Krishnamurti et al. |
| 5,668,228 | A | 9/1997 | Chinh et al. |
| 5,684,097 | A | 11/1997 | Palmroos et al. |
| 5,965,677 | A | 10/1999 | Stephan et al. |
| 6,022,935 | A | 2/2000 | Fischer et al. |
| 6,031,056 | A | 2/2000 | Friederichs et al. |
| 6,063,879 | A | 5/2000 | Stephan et al. |
| 6,235,672 | B1 | 5/2001 | McKay et al. |
| 6,277,931 | B1 | 8/2001 | Jaber et al. |
| 6,300,436 | B1 | 10/2001 | Agapiou et al. |
| 6,306,984 | B1 | 10/2001 | Agapiou et al. |
| 6,342,463 | B1 | 1/2002 | Stephan et al. |
| 6,372,864 | B1 | 4/2002 | Brown |
| 6,391,819 | B1 | 5/2002 | Agapiou et al. |
| 6,472,342 | B2 | 10/2002 | Agapiou et al. |
| 6,562,924 | B2 | 5/2003 | Benazouzz et al. |
| 6,608,153 | B2 | 8/2003 | Agapiou et al. |
| 6,777,509 | B2 | 8/2004 | Brown et al. |
| 6,984,695 | B2 | 1/2006 | Brown et al. |
| 7,354,880 | B2 | 4/2008 | Agapiou et al. |
| 7,476,715 | B2 | 1/2009 | McKay et al. |
| 9,133,284 | B2 | 9/2015 | Morrison et al. |
| 2011/0184124 | A1 | 7/2011 | Stakem et al. |

FOREIGN PATENT DOCUMENTS

| | | |
|---|---|---|
| CA | 2092769 A1 | 9/1993 |
| CA | 2742461 A1 | 12/2012 |
| EP | 0 107 127 A1 | 2/1984 |
| WO | 2015/059268 A1 | 4/2015 |
| WO | 2015/059280 A1 | 4/2015 |

OTHER PUBLICATIONS

ASTM D1238-10; Standard Test Method for Melt Flow Rates of Thermoplastics by Extrusion Plastometer; ASTM International, pp. 1-15.

ASTM D792-13; Standard Test Methods for Density and Specific Gravity (Relative Density) of Plastics by Displacement; ASTM International, pp. 1-6.

ASTM D6474-99 (Reapproved 2006); Standard Test Method for Determining Molecular Weight Distribution and Molecular Weight Averages of Polyolefins by High Temperature Gel Permeation Chromatography; ASTM International, pp. 1-6.

ASTM D6645-01; Standard Test Method for Methyl (Comonomer) Content in Polyethylene by Infrared Spectrophotometry; ASTM International, pp. 1-4.

Pangborn, Amy B.; Giardello, Michael A.; Grubba, Robert H.; Rosen, Robert K. and Timmers, Francis J.; Safe and Convenient Procedure for Solvent Purification; Copyright 1996, American Chemical Society, Organometallics 1996, vol. 15, No. 5, pp. 1518-1520.

Severn, John R. and Chadwick, John C.; Activation of Titanium-Based Single-Site Catalysts for Ethylene Polymerization Using Supports of Type $MgCl_2/AlR_n(EOt)_{3-n}$; Macromolecular Chemistry and Physics (2004), 205, pp. 1987-1994.

MgCl₂ Particles (Prior to Ether Removal)

MgCl₂ Particles (After Ether Removal by Heat Treatment)

Particles of Catalyst 1A

Particles of Catalyst 1B

Particles of Catalyst 2A

Particles of Catalyst 2B

Polymer Particles Using Catalyst 1A

Polymer Particles Using Catalyst 1B

Polymer Particles Using Catalyst 2A

Polymer Particles Using Catalyst 2B

Polymer Particles Using Comparative Catalyst 4

Polymer Particles Using Comparative Catalyst 5

SPHEROIDAL CATALYST FOR OLEFIN POLYMERIZATION

TECHNICAL FIELD

The present disclosure is directed to the use of solid, spheroidal olefin polymerization catalysts for the polymerization of ethylene with at least one alpha-olefin comonomer. The solid, spheroidal olefin polymerization catalysts comprise a spheroidal $MgCl_2$ support, a phosphinimine catalyst and a cocatalyst.

BACKGROUND ART

The use of solid, spheroidal catalysts for use in the heterogeneous polymerization of ethylene is well known. The prior art catalysts are typically based on metallocene catalysts or Ziegler-Natta catalysts and are supported on spheroidal magnesium chloride supports. Methods for preparing such catalysts include methods which rely on emulsion, spray drying, and controlled precipitation techniques. These catalysts may provide for improved product morphology and bulk density.

U.S. Pat. Nos. 5,106,804 and 5,439,995 describe the use of a spheroidal catalyst based on a zirconocene single site catalyst supported on spheroidal magnesium chloride particles. Pre-polymerization, followed by polymerization using these catalysts gave polymer with good morphology. The spheroidal magnesium chloride support particles are made in the presence of a non-reactive electron donor compound such as a non-protic ether compound. For further descriptions of spheroidal magnesium chloride particles and their use as supports see CA Pat. Nos. 1,189,053; 2,036,767 and 2,092,769.

DETAILED DESCRIPTION OF DISCLOSURE

We have found that the morphology of the magnesium chloride particles is essentially unchanged when the non-reactive electron donor is substantially removed, and that such particles can be used to make solid, spheroidal catalysts based on phosphinimine catalysts. The solid, spheroidal phosphinimine based catalysts give polyethylene polymer having good morphology, even in the absence of a pre-polymerization step.

Provided is a spheroidal olefin polymerization catalyst having a particle size distribution characterized by a Dm*/Dn of less than 3.0, wherein said catalyst comprises: a phosphinimine catalyst, a cocatalyst, and a spheroidal magnesium chloride support, wherein the magnesium chloride support comprises particles with a mass average diameter Dm of 5 to 100 µm, a particle size distribution characterized by a Dm/Dn of less than 3.0, and comprises less than 2% by weight of an electron donor compound.

Provided is a method of making a spheroidal olefin polymerization catalyst having a particle size distribution characterized by a Dm*/Dn of less than 3.0, wherein said method comprises: i) combining a dialkylmagnesium compound with a non-protic ether, ii) combining the product of step i) with a source of chloride anion, iii) treating the product of step ii) to substantially remove the non-protic ether, iv) combining the product of step iii) with a phosphinimine catalyst and a cocatalyst.

Provided is a process for polymerizing ethylene and at least one alpha-olefin to produce an ethylene copolymer, said process comprising contacting a spheroidal olefin polymerization catalyst with ethylene and at least one alpha-olefin in a polymerization reactor, wherein said spheroidal olefin polymerization catalyst has a particle size distribution characterized by a Dm*/Dn of less than 3.0 and comprises: a phosphinimine catalyst, a cocatalyst, and a spheroidal magnesium chloride support; wherein the magnesium chloride support comprises particles with a mass average diameter Dm of 5 to 100 µm, a particle size distribution characterized by a Dm/Dn of less than 3.0, and comprises less than 2% by weight of an electron donor compound.

Provided is a spheroidal ethylene copolymer comprising at least 75 wt % of ethylene units with the balance being alpha-olefin units, the polyethylene having a density of from 0.910 $g/cm^3$ to 0.936 $g/cm^3$ and a particle size distribution characterized by a Dm*/Dn of less than 3.0; wherein the polyethylene is made by polymerizing ethylene and at least one alpha-olefin with a spheroidal olefin polymerization catalyst having a particle size distribution characterized by a Dm*/Dn of less than 3.0, and comprising: a phosphinimine catalyst, a cocatalyst, and a spheroidal magnesium chloride support; wherein the magnesium chloride support comprises particles with a mass average diameter Dm of 5 to 100 µm, a particle size distribution characterized by a Dm/Dn of less than 3.0, and comprises less than 2% by weight of an electron donor compound.

BEST MODE FOR CARRYING OUT THE DISCLOSURE

Figure 1:
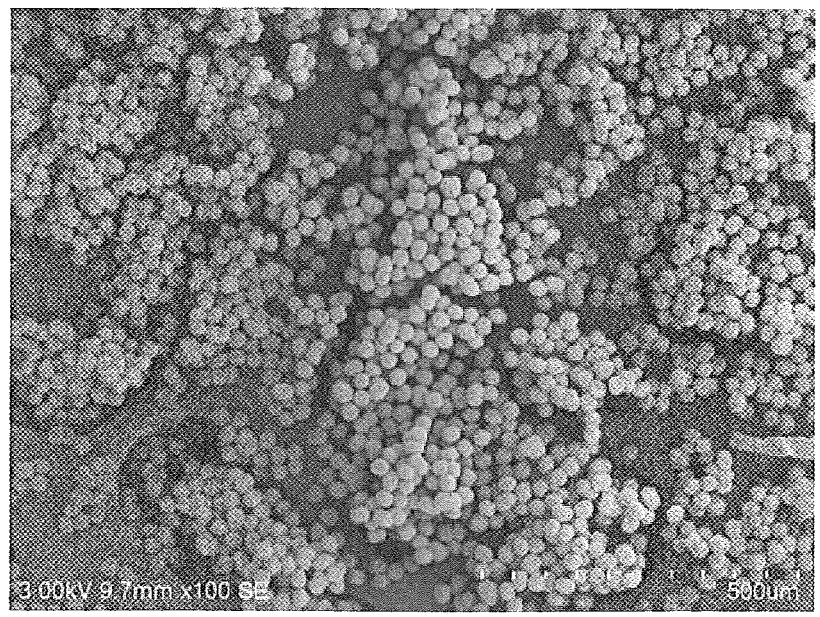
FIG. 1 shows an SEM micrograph of $MgCl_2$ support particles.

The present disclosure provides solid spheroidal catalysts based on a phosphinimine catalyst which is supported on a magnesium chloride matrix. The catalyst polymerizes ethylene optionally with one or more alpha-olefins to give an ethylene (co)polymer having improved morphology and bulk density.

By the term "spheroidal" it is meant that the particles will have a spheroidal shape defined by the fact that the long axis D of the particle divided by the short axis d of the particle is ≤1.5, or ≤1.3, or when viewed under a stereomicroscope has a generally spherical shape or when viewed with a scanning electron microscope (SEM) has a generally spherical shape.

The solid, spheroidal catalyst of the present disclosure comprises a phosphinimine catalyst, a cocatalyst and a magnesium chloride support.

The solid catalyst is comprised of spheroidal (spherical like) particles with a particle size distribution characterized by a Dm*/Dn of ≤3.0, where Dm* is the "relative" mass average diameter of the catalyst particles and Dn is the number average diameter of the catalyst particles.

In an embodiment of the disclosure, the spheroidal catalyst particles have a Dm*/Dn of 2.5 or less. In an embodiment of the disclosure, the spheroidal catalyst particles have a Dm*/Dn of 2.0 or less. In an embodiment of the disclosure, the spheroidal catalyst particles have a Dm*/Dn of 1.5 or less. In further embodiments of the disclosure, the spheroidal catalyst particles have a Dm*/Dn of from 1.0 to 3.0, or from 1.0 to 2.75, or from 1.0 to 2.5, or from 1.0 to 2.0, or from 1.0 to 1.5.

In an embodiment of the disclosure, the solid spheroidal catalyst particles have a mass average diameter, Dm of from 5 to 100 micrometers (μm), or any narrower range within this range. In an embodiment of the disclosure, the spheroidal catalyst particles have a Dm of from 5 to 75 μm. In another embodiment of the disclosure, the spheroidal catalyst particles have a Dm of from 5 to 50 μm. In further embodiments of the disclosure, the spheroidal catalyst particles have a Dm of from 5 to 40 μm, or from 5 to 30 μm, or from 5 to 25 μm, or from 10 to 50 μm, or from 10 to 40 μm, or from 10 to 30 μm.

The support used in the present disclosure consists essentially of magnesium chloride, wherein the magnesium chloride is in the form of spheroidal particles having a mass average diameter Dm of between 10 and 100 μm and a particle size distribution, defined as the mass average diameter, Dm over the number average diameter, Dn of ≤3.0. Such spheroidal magnesium chloride supports as well as their preparation are well known in the art, as disclosed in CA Pat. No. 1,189,053 and U.S. Pat. No. 5,106,804. The magnesium chloride support may also contain small amounts of chloride containing aluminum compounds, such as for example, trichloroaluminum, and Grignard moieties such as Mg-carbon bonds, or compounds having Mg-carbon bonds.

In an embodiment of the disclosure, the magnesium chloride support will contain substantially no Mg-carbon bonds.

The spheroidal magnesium chloride (MgCl$_2$) support is generally prepared by reacting a diorganomagnesium compound with an organic chloride compound in the presence of a suitable electron-donating compound. Hence, during the formation of the magnesium chloride support an electron-donor compound must be present to induce the formation of a spheroidal magnesium chloride support. Preferably, the electron-donor compound is chosen from electron-donor compounds having moieties or functional groups which will not react with a diorganomagnesium compound's Mg-carbon bonds. Hence, electron donor compounds such as water, alcohols, and phenols, are preferably avoided.

Without wishing to be bound by theory, the electron donor compound is believed to act as a complexing agent and not as a reactant, and helps the MgCl$_2$ particles form in a highly spheroidal and uniform shape.

The diorganomagnesium compound may be a dihydrocarbylmagnesium such as dialkylmagnesium or diarylmagnesium.

In an embodiment of the disclosure, a diorganomagnesium compound has the general formula MgR$^a$R$^b$ where R$^a$ and R$^b$ are each independently selected from C$_1$ to C$_{20}$ hydrocarbyl groups. In another embodiment of the disclosure, a diorganomagnesium compound has the general formula MgR$^a$R$^b$ where R$^a$ and R$^b$ are each independently selected from C$_1$ to C$_8$ hydrocarbyl groups.

Suitable dialkylmagnesium compounds include dibutylmagnesium (e.g. di-n-butylmagnesium), diisopropylmagnesium, dihexylmagnesium (e.g. di-n-hexylmagnesium), diethylmagnesium, propylbutylmagnesium (e.g. n-propyl-n-butylmagnesium), butylethylmagnesium (e.g. n-butyl-ethylmagnesium) and other compounds having the general formula MgR$^a$R$^b$ where R$^a$ and R$^b$ are each independently selected from C$_1$ to C$_8$ linear or branched alkyl groups.

Diarylmagnesium compounds include for example diphenylmagnesium, and ditolylmagnesium.

Diorganomagnesium compounds having alkylaryl groups are also contemplated for use with the current disclosure and include for example dibenzylmagnesium.

In cases where the diorganomagnesium compound is not readily soluble in the diluents of choice for the catalyst preparation, it may be desirable to add a solubilizing compound such as an organoaluminum or organozinc compound prior to use. Such compounds are discussed in, for example, U.S. Pat. Nos. 4,127,507 and 4,250,288. Alternatively, where diorganomagnesium compounds provide solutions which are overly viscous in diluents of choice, solubilizers such as organoaluminum compounds or organozinc compounds may be used to decrease the viscosity of the solution.

In an embodiment of the disclosure, the diorganomagnesium compounds are treated with a solubilizing agent (or viscosity improving agent) and are formulated as solutions in a suitable hydrocarbon solvent. Such solutions are commercially available from suppliers such as Albermarle, Akzo Nobel, etc. For example, diorganomagnesium compounds available in hydrocarbon solution include solutions of butylethylmagnesium or dibutylmagnesium which have been treated with an organoaluminum compound to improve solubility and/or reduce solution viscosity.

The organic chloride compound is not specifically defined and can be any suitable organic chloride compound, which is capable of providing an active (i.e. reactive) chloride ion for reaction with an organomagnesium bond. Preferably the chloride source will react spontaneously and fully with the diorganomagnesium compound, but a chloride source which requires a transfer agent such as described in U.S. Pat. No. 6,031,056 is also contemplated for use with the current disclosure.

In an embodiment of the disclosure, the organic chloride compound will be an alkyl chloride having the formula R$^c$Cl, wherein R$^c$ is a C$_3$ to C$_{12}$ secondary or tertiary alkyl group.

In an embodiment of the disclosure, the molar ratio of the organic chloride compound to the diorganomagnesium compound used is during the preparation of the spheroidal magnesium chloride support is from 1.5 to 2.5.

In embodiments of the disclosure, the electron donor compound is selected from esters, thioethers, esters, sulfones, sulfoxides, secondary amides, tertiary amines, tertiary phosphines and phosphoramides.

In an embodiment of the disclosure, the electron-donor compound is an organic electron donor compound (also known as a Lewis basic compound) and is preferably free of reactive hydrogen (i.e. "non-protic" or "aprotic").

In an embodiment of the disclosure, the electron-donor compound is a non-protic organic electron donor compound.

In an embodiment of the disclosure, the electron-donor compound is a non-protic ether compound.

In an embodiment of the disclosure, the electron donor compound has low complexing power, such as a cyclic or non-cyclic ether compound.

In an embodiment of the disclosure, the electron donor compound is an aprotic organic ether compound.

In an embodiment of the disclosure, the electron donor compound is an non-protic (i.e. aprotic) aprotic organic ether compound having the formula $R^{10}OR^{11}$, where $R^{10}$ and $R^{11}$ are the same or different alkyl groups having from 1 to 12 carbons atoms.

In an embodiment of the disclosure, the molar ratio of the electronic donor compound to the diorganomagnesium compound used is during the preparation of the spheroidal magnesium chloride support is from 0.01 to 2. In further embodiments of the disclosure, the molar ratio of the electronic donor compound to the diorganomagnesium compound used is during the preparation of the spheroidal magnesium chloride support is from 0.01 to 1.5, or from 0.1 to 1.5, or from 0.1 to 1.2, or from 0.2 to 0.8.

In an embodiment of the disclosure, the formation of the spheroidal magnesium chloride support is carried out at from 0° C. to 100° C., or at from 5° C. to 80° C.

The reaction between the diorganomagnesium compound and the organic chloride compound which is carried out in the presence of the electron donor compound is carried out in an inert liquid in which the resulting magnesium chloride support is insoluble. Hence the reaction is a precipitation reaction. Suitable inert liquids are liquid hydrocarbons.

In an embodiment of the disclosure, the spheroidal magnesium chloride (i.e. $MgCl_2$) support particles have a mass average diameter Dm of from 5 to 100 micrometers (μm), or any narrower range within this range. In an embodiment of the disclosure, the spheroidal magnesium chloride support particles have a Dm of from 5 to 75 μm. In another embodiment of the disclosure, the spheroidal magnesium chloride support particles have a Dm of from 5 to 50 μm. In further embodiments of the disclosure, the spheroidal magnesium chloride support particles have a Dm of from 5 to 40 μm, or from 5 to 30 μm, or from 5 to 25 μm, or from 10 to 50 μm, or from 10 to 40 μm, or from 10 to 30 μm.

In an embodiment of the disclosure, spheroidal $MgCl_2$ support particles have a particle size distribution characterized by a Dm*/Dn of ≤3.0, where Dm* is the "relative" mass average diameter of the catalyst particles and Dn is the number average diameter of the catalyst particles.

In an embodiment of the disclosure, the spheroidal $MgCl_2$ support particles have a Dm*/Dn of 2.5 or less. In an embodiment of the disclosure, the spheroidal $MgCl_2$ support particles have a Dm*/Dn of 2.0 or less. In an embodiment of the disclosure, the spheroidal $MgCl_2$ support particles have a Dm*/Dn or 1.5 or less. In further embodiments of the disclosure, the spheroidal $MgCl_2$ support particles have a Dm*/Dn of from 1.0 to 3.0, or from 1.0 to 2.75, or from 1.0 to 2.5, or from 1.0 to 2.0, or from 1.0 to 1.5.

In an embodiment of the disclosure, spheroidal $MgCl_2$ support particles have a particle size distribution characterized by a Dm/Dn of ≤3.0, where Dm is the mass average diameter of the catalyst particles and Dn is the number average diameter of the catalyst particles.

In an embodiment of the disclosure, the spheroidal $MgCl_2$ support particles have a Dm/Dn of 2.5 or less. In an embodiment of the disclosure, the spheroidal $MgCl_2$ support particles have a Dm/Dn of 2.0 or less. In an embodiment of the disclosure, the spheroidal $MgCl_2$ support particles have a Dm/Dn or 1.5 or less. In further embodiments of the disclosure, the spheroidal $MgCl_2$ support particles have a Dm/Dn of from 1.0 to 3.0, or from 1.0 to 2.75, or from 1.0 to 2.5, or from 1.0 to 2.0, or from 1.0 to 1.5.

The magnesium chloride support used in the present disclosure, is a spheroidal magnesium chloride support which is substantially free of electron donor compounds. By "substantially free", or "substantially remove" it is meant that the $MgCl_2$ support will contain less than about 2.5 percent by weight of an electron donor compound. Indeed, the presence of organic electron donor compounds may lead to deactivation of the phosphinimine catalyst or make it difficult to load the phosphinimine catalyst on to the $MgCl_2$ support. Hence, although required for the formation of the spheroidal magnesium chloride support, as described above, an electron donor is preferably, in the present disclosure, reduced to sufficiently low quantities prior to addition of the phosphinimine catalyst to the support (e.g. the amount of an electron donor is reduced to an amount of less than about 2.5 percent by weight of the magnesium chloride support).

Any method which removes or reduces the amount of the electron donor compound from/in the spheroidal magnesium chloride support without significantly altering the morphology of the same may be used in the present disclosure.

In an embodiment of the disclosure, the organic donor compound can be removed without significantly altering the morphology of the spheroidal magnesium chloride support by treating the support with heat, optional under vacuum pressure. By vacuum pressure, it is meant the pressure is reduced to below atmospheric pressure.

In embodiments of the disclosure, the spheroidal $MgCl_2$ support will comprise less than 2.5 weight percent, or less than 2.0 weight percent, or less than 1.5 weight percent, or less than 1.0 weight percent of an electron donor compound.

In an embodiment of the disclosure, the spheroidal $MgCl_2$ support will comprise less than 2.5 weight percent of an electron donor compound after subjecting the spheroidal $MgCl_2$ support to heat treatment.

In an embodiment of the disclosure, the spheroidal $MgCl_2$ support will comprise less than 2.0 weight percent of an electron donor compound after subjecting the spheroidal $MgCl_2$ support to heat treatment.

In an embodiment of the disclosure, the spheroidal $MgCl_2$ support will comprise less than 1.5 weight percent of an electron donor compound after subjecting the spheroidal $MgCl_2$ support to heat treatment.

In an embodiment of the disclosure, the spheroidal $MgCl_2$ support will comprise less than 1.0 weight percent of an electron donor compound after subjecting the spheroidal $MgCl_2$ support to heat treatment.

In an embodiment of the disclosure, the organic donor compound can be removed without significantly altering the morphology of the spheroidal magnesium chloride support by treating the support with an organoaluminum compound (e.g. an aluminum compound having alkyl or aryl or alkylaryl group(s) attached to aluminum), an or an organoaluminum halide compound (e.g. an aluminum compound having both alkyl or aryl or akylaryl group(s) and halide(s) attached to aluminum), or an organohydrocarbyloxyaluminum compound (e.g. an aluminum compound having both alkyl, or aryl or alkylaryl group(s) and alkoxy or aryloxy or alkylaryloxy group(s) attached to aluminum). Suitable non-limiting examples of organoaluminum compounds include triisobutylaluminum, triethylaluminum, trimethylaluminum or other trialkylaluminum compounds. Suitable non-limiting examples of organoaluminum halide compounds include diethylaluminum chloride or other dialkyl aluminum chloride compounds.

In an embodiment of the disclosure, the spheroidal $MgCl_2$ support will comprise less than 2.5 weight percent of an electron donor compound after treating the spheroidal $MgCl_2$ support with an organoaluminum compound, or an organoaluminum chloride compound or an organohydrocarbyloxyaluminum compound.

In an embodiment of the disclosure, the spheroidal $MgCl_2$ support will comprise less than 2.0 weight percent of an electron donor compound after treating the spheroidal $MgCl_2$ support with an organoaluminum compound, or an organoaluminum chloride compound or an organohydrocarbyloxyaluminum compound.

In an embodiment of the disclosure, the spheroidal $MgCl_2$ support will comprise less than 1.5 weight percent of an electron donor compound after treating the spheroidal $MgCl_2$ support with an organoaluminum compound, or an organoaluminum chloride compound or an organohydrocarbyloxyaluminum compound.

In an embodiment of the disclosure a spheroidal olefin polymerization catalyst has a particle size distribution characterized by a Dm*/Dn of less than 3.0, where the catalyst comprises a phosphinimine catalyst, a cocatalyst, and a spheroidal magnesium chloride support, where the magnesium chloride support comprises particles with a mass average diameter Dm of 5 to 100 µm, a particle size distribution characterized by a Dm/Dn of less than 3.0, and comprises less than 2% by weight of an electron donor compound.

In an embodiment of the disclosure a spheroidal olefin polymerization catalyst has a particle size distribution characterized by a Dm*/Dn of less than 3.0, where the catalyst comprises a phosphinimine catalyst, a cocatalyst, and a spheroidal magnesium chloride support, where the magnesium chloride support comprises particles with a mass average diameter Dm of 5 to 100 µm, a particle size distribution characterized by a Dm/Dn of less than 3.0, and comprises less than 2% by weight of an organic electron donor compound.

In an embodiment of the disclosure a spheroidal olefin polymerization catalyst has a particle size distribution characterized by a Dm*/Dn of less than 3.0, where the catalyst comprises a phosphinimine catalyst, a cocatalyst, and a spheroidal magnesium chloride support, where the magnesium chloride support comprises particles with a mass average diameter Dm of 5 to 100 µm, a particle size distribution characterized by a Dm/Dn of less than 3.0, and comprises less than 2% by weight of a non-protic ether.

In an embodiment of the disclosure, a spheroidal olefin polymerization catalyst having a particle size distribution characterized by a Dm*/Dn of less than 3.0 is made by carrying out the following steps:
  i) combining a dialkylmagnesium compound with a non-protic ether,
  ii) combining the product of step i) with a source of chloride anion,
  iii) treating the product of step ii) to remove the non-protic ether,
  iv) combining the product of step iii) with a phosphinimine catalyst and a cocatalyst.

In an embodiment of the disclosure, a spheroidal olefin polymerization catalyst having a particle size distribution characterized by a Dm*/Dn of less than 3.0 is made by carrying out the following steps:
  i) combining a dialkylmagnesium compound with a non-protic ether,
  ii) combining the product of step i) with a source of chloride anion,
  iii) heating the product of step ii) to remove the non-protic ether,
  iv) combining the product of step iii) with a phosphinimine catalyst and a cocatalyst.

In an embodiment of the disclosure, a spheroidal olefin polymerization catalyst having a particle size distribution characterized by a Dm*/Dn of less than 3.0 is made by carrying out the following steps:
  i) combining a dialkylmagnesium compound with a non-protic ether,
  ii) combining the product of step i) with a source of chloride anion,
  iii) treating the product of step ii) with an alkylaluminumchloride compound to remove the non-protic ether,
  iv) combining the product of step iii) with a phosphinimine catalyst and a cocatalyst.

The present disclosure is not limited to any particular procedure for supporting a phosphinimine catalyst or cocatalyst components on the magnesium chloride support. Processes for depositing such catalysts (e.g. a phosphinimine catalyst) as well as a cocatalyst (e.g. MMO) on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright © 2001 by John Wiley & Sons, Inc.; for some non-limiting methods to support an organotransition metal catalyst see U.S. Pat. No. 5,965,677). For example, a phosphinimine catalyst may be added to a support by co-precipitation with the support material. The cocatalyst can be added to the support before and/or after the phosphinimine catalyst or together with the phosphinimine catalyst. Optionally, the cocatalyst can be added to a supported phosphinimine catalyst in situ or a phosphinimine catalyst may be added to the support in situ or a phosphinimine catalyst can be added to a supported activator in situ. A phosphinimine catalyst and/or a cocatalyst may be slurried or dissolved in a suitable diluent or solvent and then added to the support. Suitable solvents or diluents include but are not limited to hydrocarbons and mineral oil. A phosphinimine catalyst for example, may be added to the solid support, in the form of a solid, solution or slurry, followed by the addition of the cocatalyst in solid form or as a solution or slurry. Phosphinimine catalyst, cocatalyst, and support can be mixed together in the presence or absence of a solvent.

In an embodiment of the disclosure, the phosphinimine catalyst and cocatalyst are combined in an inert solvent or diluent and the combination is added to a $MgCl_2$ support.

Some non-limiting examples of phosphinimine catalysts can be found in U.S. Pat. Nos. 6,342,463; 6,235,672; 6,372,864; 6,984,695; 6,063,879; 6,777,509 and 6,277,931 all of which are incorporated by reference herein.

Preferably, the phosphinimine catalyst is based on metals from group 4, which includes titanium, hafnium and zirconium. The most preferred phosphinimine catalysts are group 4 metal complexes in their highest oxidation state.

The phosphinimine catalysts described herein, usually require activation by one or more cocatalytic or activator species in order to provide polymer from olefins.

A phosphinimine catalyst is a compound (typically an organometallic compound) based on a group 3, 4 or 5 metal and which is characterized as having at least one phosphinimine ligand. Any compounds/complexes having a phosphinimine ligand and which display catalytic activity for ethylene (co)polymerization may be called "phosphinimine catalysts."

In an embodiment of the disclosure, a phosphinimine catalyst is defined by the formula: $(L)_n(PI)_mMX_p$ where M is a transition metal selected from Ti, Hf, Zr; PI is a phosphinimine ligand; L is a cyclopentadienyl-type ligand; X is an activatable ligand; m is 1 or 2; n is 0 or 1; and p is determined by the valency of the metal M. Preferably m is 1, n is 1 and p is 2.

In an embodiment of the disclosure, a phosphinimine catalyst is defined by the formula: $(L)(PI)MX_2$ where M is a transition metal selected from Ti, Hf, Zr; PI is a phosphinimine ligand; L is a cyclopentadienyl-type ligand; and X is an activatable ligand.

The phosphinimine ligand is defined by the formula: $R_3P=N-$, where N bonds to the metal, and wherein each R is independently selected from the group consisting of a hydrogen atom; a halogen atom; $C_{1-20}$ hydrocarbyl radicals which are unsubstituted or further substituted by one or more halogen atom and/or $C_{1-20}$ alkyl radical; $C_{1-8}$ alkoxy radical; $C_{6-10}$ aryl or aryloxy radical (the aryl or aryloxy radical optionally being unsubstituted or further substituted by one or more halogen atom and/or $C_{1-20}$ alkyl radical); amido radical; silyl radical of the formula: $-SiR'_3$ wherein each R' is independently selected from the group consisting of hydrogen, a $C_{1-8}$ alkyl or alkoxy radical, $C_{6-10}$ aryl or aryloxy radicals; and germanyl radical of the formula: $-GeR'_3$ wherein R' is as defined above.

In an embodiment of the disclosure the phosphinimine ligand is chosen so that each R is a hydrocarbyl radical. In a particular embodiment of the disclosure, the phosphinimine ligand is tri-(tertiarybutyl)phosphinimine (i.e. where each R is a tertiary butyl group, or "t-Bu" for short).

In an embodiment of the disclosure, the phosphinimine catalyst is a group 4 compound/complex which contains one phosphinimine ligand (as described above) and one ligand L which is either a cyclopentadienyl-type ligand or a heteroatom ligand.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from the group consisting of a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as $-CH_2C_6F_5$); a halogen atom; a $C_{1-8}$ alkoxy radical; a $C_{6-10}$ aryl or aryloxy radical (each of which may be further substituted by for example a halide and/or a hydrocarbyl group; for example a suitable $C_{6-10}$ aryl group is a perfluoroaryl group such as $-C_6F_5$); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula $-Si(R')_3$ wherein each R' is independently selected from the group consisting of hydrogen, a $C_{1-8}$ alkyl or alkoxy radical, $C_{6-10}$ aryl or aryloxy radicals; and a germanyl radical of the formula $-Ge(R')_3$ wherein R' is as defined directly above.

As used herein, the term "heteroatom ligand" refers to a ligand which contains at least one heteroatom selected from the group consisting of boron, nitrogen, oxygen, silicon, phosphorus or sulfur. The heteroatom ligand may be sigma or pi-bonded to the metal. Exemplary heteroatom ligands include but are not limited to "silicon containing" ligands, "amido" ligands, "alkoxy" ligands, "boron heterocycle" ligands and "phosphole" ligands.

Silicon containing ligands are defined by the formula: $-(\mu)SiR^xR^yR^z$ where the "-" denotes a bond to the transition metal and $\mu$ is sulfur or oxygen. The substituents on the Si atom, namely $R^x$, $R^y$ and $R^z$ are required in order to satisfy the bonding orbital of the Si atom. The use of any particular substituent $R^x$, $R^y$ or $R^z$ is not especially important. In an embodiment of the disclosure, each of $R^x$, $R^y$ and $R^z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond and (b) the presence of two substituents (which are typically simple alkyl or silyl groups) on the nitrogen atom.

The term "alkoxy" is also intended to convey its conventional meaning. Thus, these ligands are characterized by (a) a metal oxygen bond, and (b) the presence of a hydrocarbyl group bonded to the oxygen atom. The hydrocarbyl group may be a ring structure and may optionally be substituted (e.g. 2,6 di-tertiary butyl phenoxy).

The "boron heterocyclic" ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659 and 5,554,775 and the references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; silyl or alkoxy radicals. Phosphole ligands are also well known to those skilled in the art of olefin polymerization and are described as such in U.S. Pat. No. 5,434,116.

The term "activatable ligand" refers to a ligand which may be activated by a cocatalyst (also referred to as an "activator"), to facilitate olefin polymerization. An activatable ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins. In embodiments of the present disclosure, the activatable ligand, X is independently selected from the group consisting of a hydrogen atom; a halogen atom; a $C_{1-10}$ hydrocarbyl radical; a $C_{1-10}$ alkoxy radical; a $C_{6-10}$ aryl oxide radical, each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals. Two activatable X ligands may also be joined to one another and form for example, a substituted or unsubstituted diene ligand (i.e. 1,3-diene); or a delocalized heteroatom containing group such as an acetate group.

The number of activatable ligands depends upon the valency of the metal and the valency of the activatable ligand. The preferred phosphinimine catalysts are based on group 4 metals in their highest oxidation state (i.e. $4^+$). Particularly suitable activatable ligands are monoanionic such as a halide (e.g. chloride) or a hydrocarbyl (e.g. methyl, benzyl).

In some instances, the metal of the phosphinimine catalyst may not be in the highest oxidation state. For example, a titanium (III) component would contain only one activatable ligand.

In an embodiment of the disclosure, the phosphinimine catalyst has the formula, $(L)(PI)MX_2$, where M is Ti, Zr or Hf; PI is a phosphinimine ligand having the formula $R_3P=N-$, where R is independently selected from the group consisting of hydrogen, halogen, and $C_1$-$C_{20}$ hydrocarbyl; L is a ligand selected from the group consisting of cyclopentadienyl, substituted cyclopentadienyl, indenyl, substituted indenyl, fluorenyl, and substituted fluorenyl; and X is an activatable ligand.

In an embodiment of the disclosure, the phosphinimine catalyst has the formula: $(L)((t-Bu)_3P=N)TiX_2$, where L is a ligand selected from the group consisting of cyclopentadienyl, substituted cyclopentadienyl, indenyl, and substituted indenyl; and X is an activatable ligand.

In an embodiment of the disclosure, the phosphinimine catalyst has the formula: $(L)((t-Bu)_3P=N)TiX_2$, where L is a ligand selected from the group consisting of a substituted cyclopentadienyl and substituted indenyl; and X is an activatable ligand.

In an embodiment of the disclosure, the phosphinimine catalyst contains a phosphinimine ligand, a cyclopentadienyl ligand ("Cp" for short) and two chloride or two methyl ligands bonded to the group 4 metal.

In an embodiment of the disclosure, the phosphinimine catalyst contains a phosphinimine ligand, a singly or multiply substituted cyclopentadienyl ligand and two chloride or two methyl ligands bonded to the group 4 metal.

In an embodiment of the disclosure, the phosphinimine catalyst contains a phosphinimine ligand, a perfluoroaryl substituted cyclopentadienyl ligand and two chloride or two methyl ligands bonded to the group 4 metal.

In an embodiment of the disclosure, the phosphinimine catalyst contains a phosphinimine ligand, a perfluorophenyl substituted cyclopentadienyl ligand (i.e. Cp-$C_6F_5$) and two chloride or two methyl ligands bonded to the group 4 metal.

In an embodiment of the disclosure, the phosphinimine catalyst contains a 1,2-substituted cyclopentadienyl ligand and a phosphinimine ligand which is substituted by three tertiary butyl substituents.

In an embodiment of the disclosure, the phosphinimine catalyst contains a 1,2 substituted cyclopentadienyl ligand (e.g. a 1,2-(R*)(Ar—F)Cp) where the substituents are selected from R* a hydrocarbyl group, and Ar—F a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group respectively.

In the present disclosure, 1,2 substituted cyclopentadienyl ligands such as for example 1,2-(R*)(Ar—F)Cp ligands may contain as impurities 1,3 substituted analogues such as for example 1,3-(R*)(Ar—F)Cp ligands. Hence, phosphinimine catalysts having a 1,2 substituted Cp ligand may contain as an impurity, a phosphinimine catalyst having a 1,3 substituted Cp ligand. Alternatively, the current disclosure contemplates the use of 1,3 substituted Cp ligands as well as the use of mixtures of varying amounts of 1,2 and 1,3 substituted Cp ligands to give phosphinimine catalysts having 1,3 substituted Cp ligands or mixed phosphinimine catalysts having 1,2 and 1,3 substituted Cp ligands.

In an embodiment of the disclosure, the phosphinimine catalyst has the formula: $(1,2-(R*)(Ar—F)Cp)M(N=P(t-Bu)_3)X_2$ where R* is a hydrocarbyl group; Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group; M is Ti, Zr or Hf; and X is an activatable ligand. In an embodiment of the disclosure, the phosphinimine catalyst has the formula: $(1,2-(R*)(Ar—F)Cp)M(N=P(t-Bu)_3)X_2$ where R* is an alkyl group; Ar—F is a perfluorinated aryl group, a 2,6 (i.e. ortho) fluoro substituted phenyl group, a 2,4,6 (i.e. ortho/para) fluoro substituted phenyl group or a 2,3,5,6 (i.e. ortho/meta) fluoro substituted phenyl group; M is Ti, Zr or Hf; and X is an activatable ligand. In an embodiment of the disclosure, the phosphinimine catalyst has the formula: $(1,2-(R*)(Ar—F)Cp)M(N=P(t-Bu)_3)X_2$ where R* is a hydrocarbyl group having from 1 to 20 carbons; Ar—F is a perfluorinated aryl group; M is Ti, Zr or Hf; and X is an activatable ligand. In an embodiment of the disclosure, the phosphinimine catalyst has the formula: $(1,2-(R*)(Ar—F)Cp)M(N=P(t-Bu)_3)X_2$ where R* is a straight chain alkyl group; Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group; M is Ti, Zr or Hf; and X is an activatable ligand. In an embodiment of the disclosure, the phosphinimine catalyst has the formula: $(1,2-(n-R*)(Ar—F)Cp)Ti(N=P(t-Bu)_3)X_2$ where R* is a straight chain alkyl group; Ar—F is a perfluorinated aryl group; M is Ti, Zr or Hf; and X is an activatable ligand. In an embodiment of the disclosure, the phosphinimine catalyst has the formula: $(1,2-(R*)(C_6F_5)Cp)M(N=P(t-Bu)_3)X_2$ where R* is a hydrocarbyl group having 1 to 20 carbon atoms; M is Ti, Zr or Hf; and X is an activatable ligand. In an embodiment of the disclosure, the phosphinimine catalyst has the formula: $(1,2-(n-R*)(C_6F_5)Cp)M(N=P(t-Bu)_3)X_2$ where R* is a straight chain alkyl group; M is Ti, Zr or Hf; and X is an activatable ligand. In further embodiments, M is Ti and R* is any one of a methyl, ethyl, n-propyl, n-butyl, n-pentyl, n-hexyl, n-heptyl, and n-octyl group. In further embodiments, X is chloride or methide.

The term "perfluorinated aryl group" means that each hydrogen atom attached to a carbon atom in an aryl group has been replaced with a fluorine atom as is well understood in the art (e.g. a perfluorinated phenyl group or substituent has the formula —$C_6F_5$). In embodiments of the disclosure, Ar—F is selected from the group comprising perfluorinated phenyl or perfluorinated naphthyl groups.

Some phosphinimine catalysts which may be used in the present disclosure include: $((C_6F_5)Cp)Ti(N=P(t-Bu)_3)Cl_2$; $(1,2-(n-propyl)(C_6F_5)Cp)Ti(N=P(t-Bu)_3)Cl_2$, $(1,2-(n-butyl)(C_6F_5)Cp)Ti(N=P(t-Bu)_3)Cl_2$ and $(1,2-(n-hexyl)(C_6F_5)Cp)Ti(N=P(t-Bu)_3)Cl_2$.

In an embodiment of the disclosure, the phosphinimine catalyst will have a single or multiply substituted indenyl ligand and a phosphinimine ligand which is substituted by three tertiary butyl substituents.

An indenyl ligand (or "Ind" for short) as defined in the present disclosure will have framework carbon atoms with the numbering scheme provided below, so the location of a substituent can be readily identified.

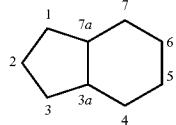

In an embodiment of the disclosure, the phosphinimine catalyst will have a singly substituted indenyl ligand and a phosphinimine ligand which is substituted by three tertiary butyl substituents.

In an embodiment of the disclosure, the phosphinimine catalyst will have a singly or multiply substituted indenyl ligand where the substituent is selected from the group consisting of a substituted or unsubstituted alkyl group, a substituted or an unsubstituted aryl group, and a substituted or unsubstituted benzyl (e.g. $C_6H_5CH_2$—) group. Suitable substituents for the alkyl, aryl or benzyl group may be selected from the group consisting of alkyl groups, aryl groups, alkoxy groups, aryloxy groups, alkylaryl groups (e.g. a benzyl group), arylalkyl groups and halide groups.

In an embodiment of the disclosure, the phosphinimine catalyst will have a singly substituted indenyl ligand, $R^¥$-Indenyl, where the $R^¥$ substituent is a substituted or unsubstituted alkyl group, a substituted or an unsubstituted aryl group, or a substituted or unsubstituted benzyl group. Suitable substituents for an $R^¥$ alkyl, $R^¥$ aryl or $R^¥$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the disclosure, the phosphinimine catalyst will have an indenyl ligand having at least a 1-position substituent (1-$R^¥$) where the substituent $R^¥$ is a substituted or unsubstituted alkyl group, a substituted or an unsubstituted aryl group, or a substituted or unsubstituted benzyl group. Suitable substituents for an $R^¥$ alkyl, $R^¥$ aryl or $R^¥$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the disclosure, the phosphinimine catalyst will have a singly substituted indenyl ligand, 1-$R^¥$-Indenyl where the substituent $R^¥$ is in the 1-position of the indenyl ligand and is a substituted or unsubstituted alkyl group, a substituted or unsubstituted aryl group, or a substituted or an unsubstituted benzyl group. Suitable substituents for an $R^¥$ alkyl, $R^¥$ aryl or $R^¥$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the disclosure, the phosphinimine catalyst will have a singly substituted indenyl ligand, 1-$R^¥$-Indenyl, where the substituent $R^¥$ is a (partially/fully) halide substituted alkyl group, a (partially/fully) halide substituted benzyl group, or a (partially/fully) halide substituted aryl group.

In an embodiment of the disclosure, the phosphinimine catalyst will have a singly substituted indenyl ligand, 1-$R^¥$-Indenyl, where the substituent $R^¥$ is a (partially/fully) halide substituted benzyl group.

When present on an indenyl ligand, a benzyl group can be partially or fully substituted by halide atoms, preferably fluoride atoms. The aryl group of the benzyl group may be a perfluorinated aryl group, a 2,6 (i.e. ortho) fluoro substituted phenyl group, 2,4,6 (i.e. ortho/para) fluoro substituted phenyl group or a 2,3,5,6 (i.e. ortho/meta) fluoro substituted phenyl group respectively. The benzyl group is, in an embodiment of the disclosure, located at the 1 position of the indenyl ligand.

In an embodiment of the disclosure, the phosphinimine catalyst will have a singly substituted indenyl ligand, 1-$R^¥$-Indenyl, where the substituent $R^¥$ is a pentafluorobenzyl ($C_6F_5CH_2$—) group.

In an embodiment of the disclosure, the phosphinimine catalyst has the formula: $(1-R^¥-(Ind))M(N=P(t-Bu)_3)X_2$ where $R^¥$ is a substituted or unsubstituted alkyl group, a substituted or an unsubstituted aryl group, or a substituted or unsubstituted benzyl group, wherein substituents for the alkyl, aryl or benzyl group are selected from the group consisting of alkyl, aryl, alkoxy, aryloxy, alkylaryl, arylalkyl and halide substituents; M is Ti, Zr or Hf; and X is an activatable ligand.

In an embodiment of the disclosure, the phosphinimine catalyst has the formula: $(1-R^¥-(Ind))M(N=P(t-Bu)_3)X_2$ where $R^¥$ is an alkyl group, an aryl group or a benzyl group and wherein each of the alkyl group, the aryl group, and the benzyl group may be unsubstituted or substituted by at least one fluoride atom; M is Ti, Zr or Hf; and X is an activatable ligand.

In an embodiment of the disclosure, the phosphinimine catalyst has the formula: $(1-R^¥-(Ind))M(N=P(t-Bu)_3)X_2$ where $R^¥$ is an alkyl group, an aryl group or a benzyl group and wherein each of the alkyl group, the aryl group, and the benzyl group may be unsubstituted or substituted by at least one halide atom; M is Ti, Zr or Hf; and X is an activatable ligand.

In an embodiment of the disclosure, the phosphinimine catalyst has the formula: $(1-R^¥-(Ind))Ti(N=P(t-Bu)_3)X_2$ where $R^¥$ is an alkyl group, an aryl group or a benzyl group and wherein each of the alkyl group, the aryl group, and the benzyl group may be unsubstituted or substituted by at least one fluoride atom; and X is an activatable ligand.

In an embodiment of the disclosure, the phosphinimine catalyst has the formula: $(1-C_6F_5CH_2-Ind)M(N=P(t-Bu)_3)X_2$, where M is Ti, Zr or Hf; and X is an activatable ligand.

In an embodiment of the disclosure, the phosphinimine catalyst has the formula: $(1-C_6F_5CH_2-Ind)Ti(N=P(t-Bu)_3)X_2$, where X is an activatable ligand.

In an embodiment of the disclosure, the phosphinimine catalyst has the formula: $(1\text{-}C_6F_5CH_2\text{-}Ind)Ti(N=P(t\text{-}Bu)_3)Cl_2$.

In the present disclosure, the phosphinimine catalyst is used in combination with at least one activator (or "cocatalyst") to form an active polymerization catalyst system for olefin polymerization. Activators (i.e. cocatalysts) include ionic activator cocatalysts and hydrocarbyl aluminoxane cocatalysts.

The activator used to activate the phosphinimine catalyst can be any suitable activator including one or more activators selected from the group consisting of alkylaluminoxanes and ionic activators, optionally together with an alkylating agent.

The alkylaluminoxanes are complex aluminum compounds of the formula: $R^3_2Al^1O(R^3Al^1O)_mAl^1R^3_2$, wherein each $R^3$ is independently selected from the group consisting of $C_{1-20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the disclosure, $R^3$ of the alkylaluminoxane, is a methyl radical and m is from 10 to 40.

The alkylaluminoxanes are typically used in substantial molar excess compared to the amount of group 4 transition metal in the phosphinimine catalyst. The $Al^1$:group 4 transition metal molar ratios are from 10:1 to 10,000:1, in other cases from about 30:1 to 500:1.

In an embodiment of the disclosure, the catalyst activator is methylaluminoxane (MAO).

In an embodiment of the disclosure, the catalyst activator is modified methylaluminoxane (MMAO).

It is well known in the art, that the alkylaluminoxane can serve dual roles as both an alkylator and an activator. Hence, an alkylaluminoxane activator is often used in combination with activatable ligands such as halogens.

Alternatively, the activator of the present disclosure may be a combination of an alkylating agent (which may also serve as a scavenger) with an activator capable of ionizing the group 4 metal of the phosphinimine catalyst (i.e. an ionic activator). In this context, the activator can be chosen from one or more alkylaluminoxane and/or an ionic activator.

When present, the alkylating agent may be selected from the group consisting of $(R^4)_pMgX^2_{2-p}$ wherein $X^2$ is a halide and each $R^4$ is independently selected from the group consisting of $C_{1-10}$ alkyl radicals and p is 1 or 2; $R^4Li$ wherein in $R^4$ is as defined above, $(R^4)_qZnX^2_{2-q}$ wherein $R^4$ is as defined above, $X^2$ is halogen and q is 1 or 2; $(R^4)_sAl^2X^2_{3-s}$ wherein $R^4$ is as defined above, $X^2$ is halogen and s is an integer from 1 to 3. Preferably in the above compounds $R^4$ is a $C_{1-4}$ alkyl radical, and $X^2$ is chlorine. Commercially available compounds include triethyl aluminum (TEAL), diethyl aluminum chloride (DEAC), dibutyl magnesium ($(Bu)_2Mg$), and butyl ethyl magnesium (BuEtMg or BuMgEt).

The ionic activator may be selected from the group consisting of: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula $-Si-(R^7)_3$; wherein each $R^7$ is independently selected from the group consisting of a hydrogen atom and a $C_{1-4}$ alkyl radical; and (ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with a nitrogen atom may form an anilinium radical and $R^6$ is as defined above; and (iii) compounds of the formula $B(R^6)_3$ wherein $R^6$ is as defined above.

In the above compounds preferably $R^6$ is a pentafluorophenyl radical, and $R^5$ is a triphenylmethyl cation, Z is a nitrogen atom and $R^8$ is a $C_{1-4}$ alkyl radical or one $R^8$ taken together with a nitrogen atom forms an anilinium radical (e.g. $PhR^8_2NH^+$, which is substituted by two $R^8$ radicals such as for example two $C_{1-4}$ alkyl radicals).

Examples of compounds capable of ionizing the phosphinimine catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl)boron, triphenylphosphonium tetra)phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltrispentafluorophenyl borate, triphenylmethylium phenyl-trispentafluorophenyl borate, benzene (diazonium) phenyltrispentafluorophenyl borate, tropillium tetrakis (2,3,5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4,5-trifluorophenyl) borate, benzene (diazonium) tetrakis (3,4,5-trifluorophenyl) borate, tropillium tetrakis (1,2,2-trifluoroethenyl) borate, trophenylmethylium tetrakis (1,2,2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3,4,5-tetrafluorophenyl) borate, and benzene (diazonium) tetrakis (2,3,4,5-tetrafluorophenyl) borate.

Commercially available activators which are capable of ionizing the group 4 metal of the phosphinimine catalyst include: N,N-dimethylaniliniumtetrakispentafluorophenyl borate ("$[Me_2NHPh][B(C_6F_5)_4]$"); triphenylmethylium tetrakispentafluorophenyl borate ("$[Ph_3C][B(C_6F_5)_4]$"); and trispentafluorophenyl boron and MAO (methylaluminoxane) and MMAO (modified methylaluminoxane).

The ionic activators compounds may be used in amounts which provide a molar ratio of group 4 transition metal to boron that will be from 1:1 to 1:6.

Optionally, mixtures of alkylaluminoxanes and ionic activators can be used as activators in the polymerization catalyst.

Olefin polymerization processes which are compatible with the current disclosure include gas phase, slurry phase, and solution phase polymerization processes.

In an embodiment of the disclosure, ethylene copolymerization with an alpha-olefin is carried out in the gas phase, in for example a fluidized bed reactor.

In an embodiment of the disclosure, ethylene copolymerization with an alpha-olefin is carried out in the slurry phase, in for example a slurry phase loop or continuously stirred reactor.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is in some cases from about 5° C. to about 200° C., in other cases less than about 120° C., e.g. from about 10° C. to 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000-9100 kPa) when propane is used (see U.S. Pat. No. 5,684,097). The pressure in a slurry process is sufficiently high to keep at least part of the ethylene monomer in the liquid phase. The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let-down valves, the slurry enters a settling leg and then is let down in pressure to flash the diluent and unreacted monomers and recover the polymer generally in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,543,399; 4,588,790; 5,028,670; 5,317,036; 5,352,749; 5,405,922; 5,436,304; 5,453,471; 5,462,999; 5,616,661 and 5,668,228). In general, a fluidized bed gas phase polymerization reactor employs a "bed" of polymer and catalyst which is fluidized by a flow of monomer and other optional components which are at least partially gaseous. Heat is generated by the enthalpy of polymerization of the monomer (and optional comonomer(s)) flowing through the bed. Un-reacted monomer and other optional gaseous components exit the fluidized bed and are contacted with a cooling system to remove this heat. The cooled gas stream, including monomer, and optional other components (such as condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 Psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

The reactor temperature in a gas phase process may vary according to the heat of polymerization as described above. In a one embodiment, the reactor temperature can be from about 30° C. to about 130° C. In another embodiment, the reactor temperature can be from about 60° C. to about 120° C. In yet another embodiment, the reactor temperature can be from about 70° C. to about 110° C. In still yet another embodiment, the temperature of a gas phase process can be from about 70° C. to about 100° C.

The fluidized bed process described above is well adapted for the preparation of polyethylene and polyethylene copolymers. Hence, monomers and comonomers include ethylene and $C_{3-12}$ alpha olefins which are unsubstituted or substituted by up to two $C_{1-6}$ hydrocarbyl radicals; $C_{8-12}$ vinyl aromatic olefins which are unsubstituted or substituted by up to two substituents selected from the group consisting of $C_{1-4}$ hydrocarbyl radicals; and $C_{4-12}$ straight chained or cyclic diolefins which are unsubstituted or substituted by a $C_{1-4}$ hydrocarbyl radical. Illustrative non-limiting examples of alpha-olefins that may be copolymerized with ethylene include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, hydrocarbyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment, the disclosure is directed toward a polymerization process involving the polymerization of one or more of the monomer(s) and comonomer(s) including ethylene alone or in combination with one or more linear or branched comonomer(s) having in some cases from 3 to 30 carbon atoms, in other cases from 3-12 carbon atoms and in still other cases 4 to 8 carbon atoms. The process is particularly well suited to copolymerization reactions involving polymerization of ethylene in combination with one or more of the comonomers, for example, the alpha-olefins: propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. In some cases the comonomer is an alpha-olefin having from 3 to 15 carbon atoms, in other cases from 4 to 12 carbon atoms and in still other cases 4 to 10 carbon atoms.

In an embodiment of the present disclosure, ethylene is copolymerized with an alpha olefin having from 3-10 carbon atoms and ethylene makes up at least 75 wt % of the total olefin feed entering the reactor.

In an embodiment of the present disclosure, ethylene is copolymerized with an alpha olefin having from 3-10 carbon atoms and ethylene makes up at least 85 wt % of the total olefin feed entering the reactor.

In embodiments of the present disclosure, ethylene is copolymerized with propylene, 1-butene, 1-hexene or 1-octene.

In an embodiment of the present disclosure, ethylene is copolymerized with 1-butene and ethylene makes up at least 75 weight % (i.e. wt %) of the total olefin feed entering the reactor.

In an embodiment of the present disclosure, ethylene is copolymerized with 1-hexene and ethylene makes up at least 75 wt % of the total olefin feed entering the reactor.

In an embodiment of the present disclosure, ethylene is copolymerized with 1-hexene and ethylene makes up at least 85 wt % of the total olefin feed entering the reactor.

Gas phase fluidized bed polymerization processes may employ a polymer seed bed in the reactor prior to initiating the polymerization process. It is contemplated by the current disclosure to use a polymer seed bed that has been treated with a catalyst modifier or an optional scavenger (see below). In addition, the polymer products obtained by using the catalysts and processes of the current disclosure may themselves be used as polymer seed bed materials.

In an embodiment of the disclosure, a process for polymerizing ethylene and optionally at least one alpha-olefin to produce an ethylene polymer or copolymer, comprises contacting a spheroidal olefin polymerization catalyst with ethylene and optionally at least one alpha-olefin in a polymerization reactor, wherein said spheroidal olefin polymerization catalyst has a particle size distribution characterized by a Dm*/Dn of less than 3.0 and comprises: a phosphinimine catalyst, a cocatalyst, and a spheroidal magnesium chloride support; wherein the magnesium chloride support comprises particles with a mass average diameter Dm of 5 to 100 µm, a particle size distribution characterized by a Dm/Dn of less than 3.0, and comprises less than 2% by weight of an electron donor compound.

Optionally, scavengers are added to the polymerization process. The present disclosure can be carried out in the presence of any suitable scavenger or scavengers. Scavengers are well known in the art.

In an embodiment of the disclosure, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or alkylaluminoxanes having the formula: $R^3{}_2Al^1O(R^3Al^1O)_mAl^1R^3{}_2$ wherein each $R^3$ is independently selected from the group consisting of $C_{1-20}$ hydrocarbyl radicals and m is from 3 to 50. Some non-limiting scavengers useful in the current disclosure include triisobutylaluminum, triethylaluminum, trimethylaluminum or other trialkylaluminum compounds.

The scavenger may be used in any suitable amount but by way of non-limiting examples only, can be present in an amount to provide a molar ratio of Al:M (where M is the metal of the organometallic compound) of from about 20 to about 2000, or from about 50 to about 1000, or from about 100 to about 500. Generally the scavenger is added to the reactor prior to the catalyst and in the absence of additional poisons and over time declines to 0, or is added continuously.

Optionally, the scavengers may be independently supported. For example, an inorganic oxide that has been treated with an organoaluminum compound or alkylaluminoxane may be added to the polymerization reactor. The method of addition of the organoaluminum or alkylaluminoxane compounds to the support is not specifically defined and is carried out by procedures well known in the art.

A "catalyst modifier" is a compound which, when added to a polymerization catalyst system or used in the presence of the same in appropriate amounts, can reduce, prevent or mitigate at least one of: fouling, sheeting, temperature excursions, and static level of a material in polymerization reactor; can alter catalyst kinetics; and/or can alter the properties of copolymer product obtained in a polymerization process.

A long chain amine type catalyst modifier may be added to a reactor zone (or associated process equipment) separately from the polymerization catalyst system, as part of the polymerization catalyst system, or both as described in co-pending CA Pat. Appl. No. 2,742,461. The long chain amine can be a long chain substituted monoalkanolamine, or a long chain substituted dialkanolamine as described in co-pending CA Pat. Appl. No. 2,742,461, which is incorporated herein in full.

In an embodiment of the disclosure, the catalyst modifier employed comprises at least one long chain amine compound represented by the formula: $R^9R^{10}{}_xN((CH_2)_nOH)_y$, where $R^9$ is a hydrocarbyl group having from 5 to 30 carbon atoms, $R^{10}$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the disclosure, the catalyst modifier comprises at least one long chain substituted monoalkanolamine represented by the formula $R^9R^{10}N((CH_2)_nOH)$ where $R^9$ is a hydrocarbyl group having anywhere from 5 to 30 carbon atoms, $R^{10}$ is a hydrogen or a hydrocarbyl group having anywhere from 1 to 30 carbon atoms, and n is an integer from 1-20.

In an embodiment of the disclosure, the catalyst modifier comprises at least one long chain substituted dialkanolamine represented by the formula: $R^9N((CH_2)_nOH)((CH_2)_mOH)$ where $R^9$ is a hydrocarbyl group having anywhere from 5 to 30 carbon atoms, and n and m are integers from 1-20.

In an embodiment of the disclosure, the catalyst modifier comprises at least one long chain substituted dialkanolamine represented by the formula: $R^9N((CH_2)_xOH)_2$ where $R^9$ is a hydrocarbyl group having anywhere from 6 to 30 carbon atoms, and x is an integer from 1-20.

In an embodiment of the disclosure, the catalyst modifier comprises at least one long chain substituted dialkanolamine represented by the formula: $R^9N((CH_2)_xOH)_2$ where $R^9$ is a hydrocarbyl group having anywhere from 6 to 30 carbon atoms, and x is 2 or 3.

In an embodiment of the disclosure, the catalyst modifier comprises at least one long chain substituted dialkanolamine represented by the formula: $R^9N((CH_2)_xOH)_2$ where $R^9$ is a linear hydrocarbyl group having anywhere from 6 to 30 carbon atoms, and x is 2 or 3.

In an embodiment of the disclosure, the catalyst modifier comprises at least one long chain substituted dialkanolamine represented by the formula: $R^9N(CH_2CH_2OH)_2$ where $R^9$ is a linear hydrocarbyl group having anywhere from 6 to 30 carbon atoms.

In an embodiment of the disclosure, the catalyst modifier comprises at least one long chain substituted dialkanolamine represented by the formula: $R^9N(CH_2CH_2OH)_2$ where $R^9$ is a linear, saturated alkyl group having anywhere from 6 to 30 carbon atoms.

In an embodiment of the disclosure, the catalyst modifier comprises at least one long chain substituted dialkanolamine represented by the formula: $R^9N(CH_2CH_2OH)_2$ where $R^9$ is a hydrocarbyl group having anywhere from 8 to 22 carbon atoms.

In an embodiment of the disclosure, the catalyst modifier comprises a long chain substituted dialkanolamine represented by the formula: $C_{18}H_{37}N(CH_2CH_2OH)_2$.

In an embodiment of the disclosure, the catalyst modifier comprises long chain substituted dialkanolamines represented by the formulas: $C_{13}H_{27}N(CH_2CH_2OH)_2$ and $C_{15}H_{31}N(CH_2CH_2OH)_2$.

In an embodiment of the disclosure, the catalyst modifier comprises a mixture of long chain substituted dialkanolamines represented by the formula: $R^9N(CH_2CH_2OH)_2$ where $R^9$ is a hydrocarbyl group having anywhere from 8 to 18 carbon atoms.

Non limiting examples of catalyst modifiers which can be used in the present disclosure are Kemamine AS-990™, Kemamine AS-650™, Armostat-1800™, bis-hydroxy-cocoamine, 2,2'-octadecyl-amino-bisethanol, and Atmer-163™.

The amount of catalyst modifier added to a reactor (or other associated process equipment) is conveniently represented herein as the parts per million (ppm) of catalyst modifier based on the weight of copolymer produced.

The amount of catalyst modifier included in a polymerization catalyst system is conveniently represented herein as a weight percent (wt %) of the catalyst modifier based on the total weight of the polymerization catalyst system (e.g. the combined weight of the transition metal catalyst, the inert support, the cocatalyst and the catalyst modifier).

The catalyst modifier may be added to a polymerization reactor in a number of ways. The catalyst modifier may be added to a reactor system separately from the polymerization catalyst system or it may be combined with the polymerization catalyst system prior to feeding the combination to a reactor system.

If the catalyst modifier is added to the polymerization catalyst system prior to its addition to a reactor, then the catalyst modifier can be added at any point during the preparation of the polymerization catalyst system. Thus, one transition metal catalyst, at least one activator, at least one inert support and at least one catalyst modifier may be combined in any order to form a polymerization catalyst system suitable for use in the present disclosure. In some embodiments of the disclosure: the catalyst modifier may be added to a support after both the transition metal catalyst and the cocatalyst have been added; the catalyst modifier may be added to a support before either of the transition metal catalyst or the cocatalyst are added; the catalyst modifier may be added to a support after the transition metal catalyst but before the cocatalyst; the catalyst modifier may be added to a support after the cocatalyst but before the transition metal catalyst. Also, the catalyst modifier can be added in portions during any stage of the preparation of the polymerization catalyst system.

The catalyst modifier may be included in the polymerization catalyst system (or where appropriate, added to a polymerization catalyst system component or components which may comprise one transition metal catalyst, the inert support and the cocatalyst) in any suitable manner. By way of non-limiting example, the catalyst modifier may be dry blended (if it is a solid) with the polymerization catalyst system (or a polymerization catalyst system component) or it may be added neat (if the catalyst modifier is a liquid) or it may be added as solution or slurry in a suitable hydrocarbon solvent or diluent respectively. The polymerization catalyst system (or polymerization catalyst system components) can likewise be put into solution or made into a slurry using suitable solvents or diluents respectively, followed by addition of the catalyst modifier (as a neat solid or liquid or as a solution or a slurry in suitable solvents or diluents) or vice versa. Alternatively, the catalyst modifier may be deposited onto a separate support and the resulting supported catalyst modifier blended either dry or in a slurry with the polymerization catalyst system (or a polymerization catalyst system component).

In an embodiment of the present disclosure, the catalyst modifier is added to a polymerization catalyst system already comprising the single transition metal catalyst, inert support and cocatalyst. The catalyst modifier can be added to the polymerization catalyst system offline and prior to addition of the polymerization catalyst system to the polymerization zone, or the catalyst modifier may be added to the polymerization catalyst system, or components on route to a polymerization reactor.

The catalyst modifier may be fed to a reactor system using any appropriate method known to persons skilled in the art. For example, the catalyst modifier may be fed to a reactor system as a solution or as a slurry in a suitable solvent or diluent respectively. Suitable solvents or diluents are inert hydrocarbons well known to persons skilled in the art and generally include aromatics, paraffins, and cycloparaffinics such as for example benzene, toluene, xylene, cyclohexane, fuel oil, isobutane, mineral oil, kerosene and the like. Further examples include but are not limited to hexane, heptanes, isopentane and mixtures thereof. Alternatively, the catalyst modifier may be added to an inert support material and then fed to a polymerization reactor as a dry feed or a slurry feed. The catalyst modifier may be fed to various locations in a reactor system. When considering a fluidized bed process for example, the catalyst modifier may be fed directly to any area of the reaction zone (for example, when added as a solution), or any area of the entrainment zone, or it may be fed to any area within the recycle loop, where such areas are found to be effective sites at which to feed a catalyst modifier.

When added as a solution or mixture with a solvent or diluent respectively, the catalyst modifier may make up, for example, from 0.1 to 30 wt % of the solution or mixture, or from 0.1 to 20 wt %, or from 0.1 to 10 wt %, or from 0.1 to 5 wt % or from 0.1 to 2.5 wt % or from 0.2 to 2.0 wt %, although a person skilled in the art will recognize that further, possibly broader ranges, may also be used and so the disclosure should not be limited in this regard.

The catalyst modifier can be added to a reactor with all or a portion of one or more of the monomers or the cycle gas.

The catalyst modifier can be added to a reactor through a dedicated feed line or added to any convenient feed stream including an ethylene feed stream, a comonomer feed stream, a catalyst feed line or a recycle line.

The catalyst modifier can be fed to a location in a fluidized bed system in a continuous or intermittent manner.

In an embodiment of the disclosure, the rate of addition of a catalyst modifier to a reactor will be programmed using measured reactor static levels (or other lead indicators such as reactor temperature) as programming inputs, so as to maintain a constant or pre-determined level of static (or for example, temperature) in a polymerization reactor.

The catalyst modifier can be added to a reactor at a time before, after or during the start of the polymerization reaction.

The catalyst modifier may be added to the polymerization catalyst system or to one or more polymerization catalyst system components (e.g. a phosphinimine catalyst, inert support, or cocatalyst) on route to a reaction zone.

In an embodiment of the disclosure, the catalyst modifier is added directly to a reaction zone, separately from the polymerization catalyst system. Most typically, it is so added by spraying a solution or mixture of the catalyst modifier directly into a reaction zone.

In an embodiment of the disclosure, the catalyst modifier is included (combined) with the polymerization catalyst system before adding the combination directly to a reaction zone.

In an embodiment of the disclosure, the catalyst modifier is added to a polymer seed bed present in a reactor prior to starting the polymerization reaction by introduction of a catalyst.

In an embodiment of the disclosure, the catalyst modifier is added directly to a reaction zone, separately from a polymerization catalyst system, and the catalyst modifier is added as a mixture with an inert hydrocarbon.

In an embodiment of the disclosure, the catalyst modifier is added directly to a reaction zone, separately from a polymerization catalyst system, and the catalyst modifier is added as a mixture with an inert hydrocarbon, and is added during a polymerization reaction.

The total amount of catalyst modifier that may be fed to a reactor and/or included in the polymerization catalyst system is not specifically limited, but it should not exceed an amount which causes the organotransition metal based polymerization catalyst system activity to drop to below that which would be commercially acceptable.

In this regard, the amount of catalyst modifier fed to a reactor will generally not exceed about 150 ppm, or 100 ppm, or 75 ppm, or 50 ppm, or 25 ppm (parts per million based on the weight of the (co)polymer being produced) while the amount of catalyst modifier included in the polymerization catalyst system will generally not exceed about 10 weight percent (based on the total weight of the polymerization catalyst system, including the catalyst modifier).

In embodiments of the disclosure, the catalyst modifier fed to a reactor will be from 150 to 0 ppm, and including narrower ranges within this range, such as but not limited to, from 150 to 1 ppm, or from 150 to 5 ppm, or from 100 to 0 ppm, or from 100 to 1 ppm, or from 100 to 5 ppm, or from 75 to 0 ppm, or from 75 to 1 ppm, or from 75 to 5 ppm, or from 50 to 0 ppm, or from 50 to 1 ppm, or from 50 to 5 ppm, or from 25 to 0 ppm, or from 25 to 1 ppm, or from 25 to 5 ppm (parts per million by weight of the polymer being produced).

In embodiments of the disclosure, the amount of catalyst modifier included in the polymerization catalyst system will be from 0 to 10 weight percent, and including narrower ranges within this range, such as but not limited to, from 0 to 6.0 weight percent, or from 0.25 to 6.0 weight percent, or from 0 to 5.0 weight percent, or from 0.25 to 5.0 weight percent, or from 0 to 4.5 weight percent, or from 0.5 to 4.5 weight percent, or from 1.0 to 4.5 weight percent, or from 0.75 to 4.0 weight percent, or from 0 to 4.0 weight percent, or from 0.5 to 4.0 weight percent, or from 1.0 to 4.0 weight percent, or from 0 to 3.75 weight percent, or from 0.25 to 3.75 weight percent, or from 0.5 to 3.5 weight percent, or from 1.25 to 3.75 weight percent, or from 1.0 to 3.5 weight percent, or from 1.5 to 3.5 weight percent, or from 0.75 to 3.75 weight percent, or from 1.0 to 3.75 weight percent (wt % is the weight percent of the catalyst modifier based on the total weight of the polymerization catalyst system; e.g. the combined weight of an organotransition metal catalyst, an inert support, a catalyst activator and a catalyst modifier).

Other catalyst modifiers may be used in the present disclosure and include compounds such as carboxylate metal salts (see U.S. Pat. Nos. 7,354,880; 6,300,436; 6,306,984; 6,391,819; 6,472,342 and 6,608,153 for examples), polysulfones, polymeric polyamines and sulfonic acids (see U.S. Pat. Nos. 6,562,924; 6,022,935 and 5,283,278 for examples). Polyoxyethylenealkylamines, which are described in for example in European Pat. Appl. No. 107,127, may also be used. Further catalyst modifiers include aluminum stearate and aluminum oleate. Catalyst modifiers are supplied commercially under the trademarks OCTASTAT™ and STADIS™. The catalyst modifier STADIS is described in U.S. Pat. Nos. 7,476,715; 6,562,924 and 5,026,795 and is available from Octel Starreon. STADIS generally comprises a polysulfone copolymer, a polymeric amine and an oil soluble sulfonic acid.

Commercially available catalyst modifiers sometimes contain unacceptable amounts of water for use with polymerization catalysts. Accordingly, the catalyst modifier may be treated with a substance which removes water (e.g. by reaction therewith to form inert products, or adsorption or absorption methods), such as a metal alkyl scavenger or molecular sieves. See for example, U.S. Pat. Appl. Pub. No. 2011/0184124 for use of a scavenger compound to remove water from a metal carboxylate antistatic agent. Alternatively, a catalyst modifier may be dried under reduced pressure and elevated temperatures to reduce the amount of water present (see the Examples section below). For example, a catalyst modifier may be treated with elevated temperatures (e.g. at least 10° C. above room temperature or ambient temperature) under reduced pressure (e.g. below atmospheric pressure) to distill off water, as can be achieved by using a dynamic vacuum pump.

In the present disclosure, the term "ethylene copolymer" is used interchangeably with the term "copolymer", or "polyethylene copolymer" and the like, and all connote a polymer consisting of polymerized ethylene units and at least one type of polymerized alpha olefin.

In an embodiment, the polymer is a copolymer of ethylene and at least one alpha-olefin.

In an embodiment, the polyethylene polymer is a copolymer of ethylene and at least one alpha-olefin chosen from propylene, 1-butene, 1-hexene and 1-octene.

In embodiments, polyethylene copolymer composition will comprise at least 75 weight % of ethylene units, or at least 80 wt % of ethylene units, or at least 85 wt % of ethylene units with the balance being an alpha-olefin unit, based on the weight of the ethylene copolymer composition.

In an embodiment of the disclosure, the ethylene copolymer will have a density of from 0.910 g/cm$^3$ to 0.936 g/cm$^3$. In an embodiment of the disclosure, the ethylene copolymer will have a density of from 0.910 g/cm$^3$ to 0.930 g/cm$^3$. In an embodiment, the ethylene copolymer has a density of from 0.913 g/cm$^3$ to 0.930 g/cm$^3$. In further embodiments, the ethylene copolymer will have a density of from 0.915 g/cm$^3$ to 0.930 g/cm$^3$, or from 0.916 g/cm$^3$ to 0.930 g/cm$^3$, or from 0.916 g/cm$^3$ to 0.925 g/cm$^3$, or from 0.916 g/cm$^3$ to 0.920 g/cm$^3$, or from 0.917 g/cm$^3$ to 0.927 g/cm$^3$, or from 0.917 g/cm$^3$ to 0.920 g/cm$^3$, or from 0.917 g/cm$^3$ to 0.919 g/cm$^3$.

In embodiment, the ethylene copolymer has a melt index of from 0.1 to 5 g/10 min.

In embodiments of the disclosure, the ethylene copolymer will have a melt index of from 0.3 to 5 g/10 min, or from 0.3 to 3 g/10 min, or from 0.5 to 2 g/10 min.

In embodiments of the disclosure, the ethylene copolymer will have a melt index of from 0.1 to 5.0 g/10 min, or from 0.25 to 5.0 g/10 min, or from 0.25 to 4.5 g/10 min, or from 0.25 to 4.0 g/10 min, or from 0.25 to 3.5 g/10 min, or from 0.25 to 3.0 g/10 min, or from 0.75 to 5.0 g/10 min, or from 0.75 to 4.5 g/10 min, or from 0.75 to 4.0 g/10 min, or from 0.75 to 3.5 g/10 min, or from 0.25 to 3 g/10 min, or from 0.25 to 2.5 g/10 min, or from 0.5 to 2.0 g/10 min, or from 0.75 to 1.5 g/10 min.

In alternate embodiments, the polyethylene copolymer has a melt index ($I_2$) of from 0.01 to 3.0 g/10 min, or from 0.1 to 2.5 g/10 min, or from 0.1 to 2.0 g/10 min, or from 0.25 to 2.0 g/10 min, or from 0.01 to 1.0 g/10 min, or from 0.1 to 1.0 g/10 min, or less than 1.0 g/10 min, or from 0.1 to less than 1.0 g/10 min, or from 0.25 to 1.0 g/10 min, or from 0.25 to 0.9 g/10 min, or from 0.25 to 0.80 g/10 min, or from 0.2 to 0.9 g/10 min, or from 0.20 to 0.85 g/10 min, or from 0.25 to 0.85 g/10 min.

In embodiments, the polyethylene copolymer will have a melt index ratio ($I_{21}/I_2$) of less than 20, or less than 18, or less than 17, or less than 16.5. In further embodiments, the polyethylene copolymer will have an $I_{21}/I_2$ of from 10 to 19.5, or from 11 to 19, or from 14 to 19, or from 13 to 17, or from 14 to 16.5, or from 14 to 16.0.

In alternative embodiments, the ethylene copolymer will have a melt index ratio ($I_{21}/I_2$) of greater than 20 or greater than 24, or greater than 26, or greater than 28. In further embodiments the polyethylene copolymer will have a melt index ratio of from 28 to 60 or from 30 to 60 or from 32 to 60, or from 30 to 55, or from 30 to 50, or from 30 to 45, or from 32 to 50 or from 35 to 55, or from 36 to 50, or from 36 to 48, or from 36 to 46, or from 35 to 50, or from greater than 35 to less than 50, or from greater than 35 to 50.

In embodiments of the disclosure, the ethylene copolymer will exhibit a weight average molecular weight ($M_W$) as determined by gel permeation chromatography (GPC) of from 30,000 to 250,000, including narrower ranges within this range, such as for example, from 50,000 to 200,000, or from 50,000 to 175,000, or from 75,000 to 150,000, or from 80,000 to 130,000.

In embodiments of the disclosure, the ethylene copolymer will exhibit a number average molecular weight ($M_n$) as determined by gel permeation chromatography (GPC) of from 5,000 to 100,000 including narrower ranges within this range, such as for example from 7,500 to 100,000, or from 7,500 to 75,000, or from 7,500 to 50,000, or from 10,000 to 100,000, or from 10,000 to 75,000, or from 10,000 to 50,000.

In embodiments of the disclosure, the ethylene copolymer will exhibit a Z-average molecular weight ($M_Z$) as determined by gel permeation chromatography (GPC) of from 50,000 to 2,000,000, including narrower ranges within this range, such as for example from 50,000, to 1,750,000, or from 50,000 to 1,500,000, or from 50,000 to 1,000,000, or from 75,000 to 750,000, or from 100,000 to 500,000, or from 100,000 to 400,000, or from 125,000 to 375,000, or from 150,000 to 350,000, or from 175,000 to 375,000, or from 175,000 to 400,000, or from 200,000 to 400,000 or from 225,000 to 375,000.

In embodiments, the ethylene copolymer will have a molecular weight distribution ($M_w/M_n$) as determined by gel permeation chromatography (GPC) of from 1.6 to 2.6, or from 1.7 to 2.5, or from 1.7 to 2.4, or from 1.7 to 2.3, or from 1.7 to 2.2, or from 1.8 to 2.4, or from 1.8 to 2.3, or from 1.8 to 2.2.

In yet another embodiment of the disclosure, the ethylene copolymer will have a molecular weight distribution ($M_w/M_n$) of ≤2.5. In still another embodiment of the disclosure, the ethylene copolymer will have a molecular weight distribution ($M_w/M_n$) of ≤2.4. In yet another embodiment of the disclosure, the ethylene copolymer will have a molecular weight distribution ($M_w/M_n$) of ≤2.3. In yet further embodiments of the disclosure, the ethylene copolymer will have a molecular weight distribution ($M_w/M_n$) of ≤2.2, or ≤2.1, or ≤2.0.

In alternative embodiments, polyethylene copolymer will have a molecular weight distribution ($M_w/M_n$) as determined by gel permeation chromatography (GPC) of from 3.5 to 7.0, including narrower ranges within this range, such as for example, from 3.5 to 6.5, or from 3.6 to 6.5, or from 3.6 to 6.0, or from 3.5 to 5.5, or from 3.6 to 5.5, or from 3.5 to 5.0, or from 4.5 to 6.0, or from 4.0 to 6.0, or from 4.0 to 5.5.

In an embodiment, the polyethylene copolymer will have a flat comonomer incorporation profile as measured using Gel-Permeation Chromatography with Fourier Transform Infra-Red detection (GPC-FTIR). In an embodiment, the polyethylene copolymer will have a negative (i.e. "normal") comonomer incorporation profile as measured using GPC-FTIR. In an embodiment, the polyethylene copolymer will have an inverse (i.e. "reverse") or partially inverse comonomer incorporation profile as measured using GPC-FTIR. If the comonomer incorporation decreases with molecular weight, as measured using GPC-FTIR, the distribution is described as "normal" or "negative". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for the copolymer, there is one or more higher molecular weight components having a higher comonomer incorporation than in one or more lower molecular weight segments. The term "reverse(d) comonomer distribution" is used herein to mean, that across the molecular weight range of the ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse".

The spheroidal magnesium chloride supported phosphinimine catalysts described herein generally provides polyethylene polymers of greater homogeneity than silica supported phosphinimine catalysts.

In embodiments of the disclosure, the ethylene copolymer will have a comonomer distribution breadth index ($CDBI_{50}$), as determined by temperature elution fractionation (TREF), of at least 40 weight percent (wt %), or at least 50 wt %, or at least 60 wt %, or at least 65 wt %, or at least 70 wt %, or at least 75 wt %. In further embodiments of the disclosure, the ethylene copolymer will have a comonomer distribution breadth index ($CDBI_{50}$), as determined by temperature elution fractionation (TREF) of from 40 wt % to 85 wt %, or from 45 wt % to 85 wt %, or from 50 wt % to 85 wt %, or from 55 wt % to 80 wt %, or from 60 wt % to 80 wt %, or from 60 wt % to 75 wt %, or from 65 wt % to 75 wt %.

In embodiment of the disclosure, a polyethylene copolymer having a melt index ratio ($I_{21}/I_2$) of less than 20 will have a comonomer distribution breadth index ($CDBI_{50}$) of greater than 55 weight percent, or greater than 60 weight percent, or greater than 65 weight percent, or greater than 70 weight percent, or greater than 75 weight percent.

In alternative embodiment of the disclosure, a polyethylene copolymer having a melt index ratio ($I_{21}/I_2$) of greater than 20 will have a comonomer distribution breadth index ($CDBI_{50}$) of greater than 50 weight percent, or greater than 55 weight percent, or greater than 60 weight percent, or greater than 65 weight percent.

In embodiment of the disclosure, a polyethylene copolymer having a melt index ratio ($I_{21}/I_2$) of less than 20 will have less than 20 weight percent, or less than 15 weight percent, or less than 10 weight percent, or less than 5 weight percent of the polyethylene represented within a temperature range of from 90° C. to 105° C. in a TREF profile.

In an alternative embodiment of the disclosure, a polyethylene copolymer having a melt index ratio ($I_{21}/I_2$) of greater than 20 will have less than 20 weight percent, or less than 15 weight percent, or less than 10 weight percent, or less than 5 weight percent of the polyethylene represented within a temperature range of from 90° C. to 105° C. in a TREF profile.

In an embodiment of the disclosure, a polyethylene copolymer comprising at least 75 wt % of ethylene units with the balance being alpha-olefin units, will have a density of from 0.910 g/cm$^3$ to 0.936 g/cm$^3$, a spheroidal particle shape and a particle size distribution characterized by a Dm*/Dn of less than 3.0.

In an embodiment of the disclosure, a polyethylene copolymer comprising at least 75 wt % of ethylene units with the balance being alpha-olefin units, will have a density of from 0.910 g/cm$^3$ to 0.936 g/cm$^3$, a spheroidal particle shape and a particle size distribution characterized by a Dm*/Dn of less than 2.5.

In an embodiment of the disclosure, a polyethylene copolymer comprising at least 75 wt % of ethylene units with the balance being alpha-olefin units, will have a density of from 0.910 g/cm$^3$ to 0.936 g/cm$^3$, a spheroidal particle shape and a particle size distribution characterized by a Dm*/Dn of less than 2.0.

In an embodiment of the disclosure, a polyethylene copolymer comprising at least 75 wt % of ethylene units with the balance being alpha-olefin units, will have a density of from 0.910 g/cm$^3$ to 0.936 g/cm$^3$, a spheroidal particle shape and a particle size distribution characterized by a Dm*/Dn of less than 1.5.

In an embodiment of the disclosure, a polyethylene copolymer comprising at least 75 wt % of ethylene units with the balance being alpha-olefin units, will have a density of from 0.910 g/cm$^3$ to 0.936 g/cm$^3$, a spheroidal particle shape, and a particle size distribution characterized by a Dm*/Dn of less than 3.0; wherein the polyethylene is made with a spheroidal olefin polymerization catalyst having a particle size distribution characterized by a Dm*/Dn of less than 3.0, and comprising: a phosphinimine catalyst, a cocatalyst, and a spheroidal magnesium chloride support; wherein the magnesium chloride support comprises particles with a mass average diameter Dm of 5 to 100 µm, a particle size distribution characterized by a Dm/Dn of less than 3.0, and comprises less than 2% by weight of an electron donor compound.

The present disclosure will now be further illustrated by the following non limiting examples.

EXAMPLES

Reagents

Diethylaluminum Chloride (97%) was purchased from Sigma Aldrich and was stored in a flammable cabinet prior to use. It was brought in to the glovebox and transferred into a hypovial immediately prior to use. Used as received.

Dibutylmagnesium as a 1M solution in heptane was purchased from Sigma Aldrich. Upon arrival the bottles were transferred to the glovebox where it was stored under a nitrogen atmosphere in the freezer (at −30° C.). It was used as received.

Diisoamyl ether was purchased from Sigma Aldrich and transferred into the glovebox upon arrival. It was then stored in the freezer at −30° C. prior to use.

A drying reagent (Drierite™) was purchased from Sigma Aldrich. The drying reagent was conditioned before use by baking it in a muffle furnace set to 260° C. for a period of 16 hours. The drying reagent contained no indicator.

2-chloro-2-methylpropane (tert-butyl chloride or tBuCl) was purchased from Sigma Aldrich. The tBuCl was dried by placing it over the pre-dried drying reagent under an inert environment for approximately 16 hours at a ratio of 30 g of drying reagent per 100 mL of tBuCl. The flask containing the tBuCl was covered in foil to shield it from light during this process to minimize the formation of isobutylene. The dried tBuCl was further purified by vacuum transfer. The tBuCl moisture content was 12 ppm or less and had purity above 97% after purification. All glassware used in this procedure was dried in a 130° C. oven overnight.

Heptane was purchased from Sigma Aldrich and further purified using with alumina and molsieve columns. It was stored in the glovebox in Nalgene bottles containing 13× molecular sieves to dry (99.9% purity).

Methylaluminoxane (MAO) was used as a 30% MAO solution (13.1 wt % Al) or as a 10% MAO solution 4.5 wt % Al) in toluene purchased from Albemarle.

The silica support for the comparative examples was Sylopol® 2408 purchased from Grace Davidson. The silica had a particle size from 12 to 76 µm and a pore volume of about 1.52 cc/gm.

Analytical Measurements

Scanning Electron Microscope:

For the examination of $MgCl_2$ particles, in order to obtain the mass average diameter (Dm) and the number average diameter (Dn), a number weighted particle size distribution was measured by electron microscopy via automated binary threshold particle recognition analysis. This analysis was performed with backscattered electron detected images obtained via a scanning electron microscope (SEM, manufacturer Hitachi "S-3400N II") equipped with an energy dispersive spectrometer (EDS, manufacturer Oxford Instruments "X-sight 450"). Oxford Instruments "INCA" software is capable of automated particle analysis via threshold particle acquisition, which is based on the principle that the particles or 'features' are recognized against a background matrix, forming a binary image where particles are recognized via a selected threshold signal level. The acquisition process is automated over a specified region where the particles have been applied to a suitable matrix (carbon tape) such that particle-to-particle touching is minimized so that particle recognition is primarily on discrete particles surrounded by the matrix background. During acquisition, both EDS spectra and particle morphological data are acquired simultaneously for both elemental composition and particle morphology for each recognized particle is recorded. The conditions used for measurement were as follows: 20 kV, aperture 1, 10 mm working distance, probe current 50-70 setting, 700× magnification field-of-view, back scattered electron detector, with a minimum of 700 particles detected.

During post-acquisition, a morphological and compositional filter was applied to remove anomalous data (non $MgCl_2$ particles) by the following criteria: particle area 150≤x≤825 μm, aspect ratio 1≤x≤2.25, excluding particles detecting Fe, Ni, Cr. The particles passing through these filter criteria were used for analysis.

Stereomicroscope:

A Carl Zeiss stereomicroscope Model #47 50 03-9901 adapted with a photographic camera was used for showing the spheroidal shape of the $MgCl_2$ support particles, the polymerization catalyst particles as well as the product ethylene copolymer particles. All the polymerization catalyst and polymer particle spheroidal shapes and uniformities were determined by pictures taken from this instrument.

Determination of Particle Size Distribution:

The mass average diameter (Dm) (or the "relative mass average diameter (Dm*)) and the number average diameter (Dn) of the support, olefin polymerization catalyst and polymer particles are determined on the basis of microscopic observations. The particle size distribution then may be characterized by Dm/Dn. For a means of determining Dm, Dn, and hence Dm/Dn, see CA Pat. No. 1,189,053 and U.S. Pat. No. 5,106,804. The particle size distribution may also be characterized by Dm*/Dn as defined below.

By obtaining by optical microscopy of a population of particles, such as a population of magnesium chloride particles, a table of absolute frequencies showing the number $n_i$ of particles belonging to each class i of diameters, where each class i is characterized by an intermediate diameter $d_i$, between the limits of each class, is obtained. Dm and Dn then are determined using the following equations: mass average diameter, $Dm=\Sigma n_i (d_i)^3 d_i/\Sigma n_i(d_i)^3$; number average diameter, $Dn=\Sigma n_i d_i/\Sigma n_i$. The ratio, Dm/Dn defines the particle size distribution, and is sometimes known as the "width of the particle size distribution". The particle size distribution can be also be characterized by taking a unit-less "relative mass average diameter" defined as Dm* over a number average diameter Dn, where the Dm* is obtained by visual examination of particle sizes of varying relative diameter and counting the number of particles in each particle diameter group or class. This allows a person skilled in the art to characterize the particle size distribution using optical equipment which does not provide an absolute value (e.g. in microns) for the mass average diameter, Dm*.

Thermogravimetric analysis was coupled with Fourier transform infrared spectrometry to provide a weight loss profile and qualitative identification of the evolved gases as a sample is heated in an inert atmosphere (UHP nitrogen). The analytical instruments used are a TA Instruments SDT2960 thermal analyzer and a Bruker Tensor 27 FTIR spectrometer. The following temperature program was used for the thermal analysis: ramp at 5° C./minute to 115° C. and hold at 115° C. for 15 minutes; ramp at 10° C./minute to 200° C. and hold at 200° C. for 30 minutes. The weight loss during the ramp to 115° C. and the 115° C. hold time is usually attributable to the loss of the solvent used during the polymerization catalyst or $MgCl_2$ support preparation process. Examples of the typical solvents used are toluene, isoamyl ether, heptane, and THF. The weight loss during the ramp to 200° C. and the 200° C. hold time is attributable to the loss of further solvent. The lack of solvent in the evolved gas during this portion of the program is an indicator that all of the solvent had evolved during the first portion of the program.

Melt index, $I_2$, in g/10 min was determined on a Tinius Olsen Plastomer (Model MP993) in accordance with ASTM D1238 condition F at 190° C. with a 2.16 kilogram weight. Melt index, $I_{10}$, was determined in accordance with ASTM D1238 condition F at 190° C. with a 10 kilogram weight. High load melt index, $I_{21}$, in g/10 min was determined in accordance with ASTM D1238 condition E at 190° C. with a 21.6 kilogram weight.

Polymer density was determined in grams per cubic centimeter (g/cc) according to ASTM D792.

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

The peak melting point ($T_m$) and percent of crystallinity of the polymers were determined by using a TA Instrument DSC Q1000 Thermal Analyser at 10° C./min. In a DSC measurement, a heating-cooling-heating cycle from room temperature to 200° C. or vice versa was applied to the polymers to minimize the thermo-mechanical history associated with them. The melting point and percent of crystallinity were determined by the primary peak temperature and the total area under the DSC curve respectively from the second heating data. The peak melting temperature $T_m$ is the higher temperature peak, when two peaks are presented in a bimodal DSC profile (typically also having the greatest peak height).

The branch frequency of the polyethylene polymer samples (i.e. the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution profile) was carried out using high temperature Gel Permeation Chromatography (GPC) and FT-IR of the eluent. Polyethylene standards with a known branch content, polystyrene and hydrocarbons with a known molecular weight were used for calibration.

To determine $CDBI_{50}$, a solubility distribution curve is first generated for the copolymer. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the $CDBI_{50}$ is determined by establishing the weight percentage of a copolymer sample that has a comonomer content within 50% of the median comonomer content on each side of the median. The weight percentage of a higher density fraction, (i.e. the wt % eluting from 90-105° C.), is determined by calculating the area under the TREF curve at an elution temperature of from 90 to 105° C. The weight percent of copolymer eluting below 40° C. can be similarly determined. For the purpose of simplifying the correlation of composition with elution temperature, all fractions are assumed to have a Mn≥15,000, where Mn is the number average molecular weight of the fraction. Any low molecular weight fractions present generally represent a trivial portion of the polymer. The remainder of this description maintains this convention of assuming all fractions have Mn≥15,000 in the $CDBI_{50}$ measurement.

Temperature rising elution fractionation (TREF) method. Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The TREF procedure described above is well known to persons skilled in the art and can be used to determine: the overall TREF profile, $CDBI_{50}$, the polyethylene polymer wt % represented at from 90° C. to 105° C.

Preparation of the Phosphinimine Catalysts

All reactions involving air and or moisture sensitive compounds were conducted under nitrogen using standard Schlenk and cannula techniques, or in a glovebox. Reaction solvents were purified either using the system described by Pangborn et. al. in *Organometallics* 1996, v15, p. 1518 or used directly after being stored over activated 4 Å molecular sieves. The aluminoxane used was a 10% MAO solution in toluene supplied by Albemarle which was used as received. The phosphinimine catalyst compound (1,2-(n-propyl) ($C_6F_5$)Cp)Ti(N=P(t-Bu)$_3$)Cl$_2$ was made in a manner similar to the procedure given in U.S. Pat. No. 7,531,602 (see Example 2). The phosphinimine compound (1-$C_6F_5CH_2$-Indenyl)((t-Bu)$_3$P=N)TiCl$_2$ was made as follows. To distilled indene (15.0 g, 129 mmol) in heptane (200 mL) was added BuLi (82 mL, 131 mmol, 1.6 M in hexanes) at room temperature. The resulting reaction mixture was stirred overnight. The mixture was filtered and the filter cake washed with heptane (3×30 mL) to give indenyllithium (15.62 g, 99% yield). Indenyllithium (6.387 g, 52.4 mmol) was added as a solid over 5 minutes to a stirred solution of $C_6F_5CH_2$—Br (13.65 g, 52.3 mmol) in toluene (100 mL) at room temperature. The reaction mixture was heated to 50° C. and stirred for 4 h. The product mixture was filtered and washed with toluene (3×20 mL). The combined filtrates were evaporated to dryness to afford 1-$C_6F_5CH_2$-indene (13.58 g, 88%). To a stirred slurry of TiCl$_4$.2THF (1.72 g, 5.15 mmol) in toluene (15 mL) was added solid (t-Bu)$_3$P=N—Li (1.12 g, 5 mmol) at room temperature. The resulting reaction mixture was heated at 100° C. for 30 min and then allowed to cool to room temperature. This mixture containing ((t-Bu)$_3$P=N)TiCl$_3$ (1.85 g, 5 mmol) was used in the next reaction. To a THF solution (10 mL) of 1-$C_6F_5CH_2$-indene (1.48 g, 5 mmol) cooled at −78° C. was added n-butyllithium (3.28 mL, 5 mmol, 1.6 M in hexanes) over 10 minutes. The resulting dark orange solution was stirred for 20 minutes and then transferred via a double-ended needle to a toluene slurry of ((t-Bu)$_3$P=N)TiCl$_3$ (1.85 g, 5 mmol). The cooling was removed from the reaction mixture which was stirred for a further 30 minutes. The solvents were evaporated to afford a yellow pasty residue. The solid was re-dissolved in toluene (70 mL) at 80° C. and filtered hot. The toluene was evaporated to afford pure (1-$C_6F_5CH_2$-Indenyl)((t-Bu)$_3$P=N)TiCl$_2$ (2.35 g, 74%).

Preparation of Spheroidal MgCl$_2$ Support

A bench scale reactor was used for the preparation of MgCl$_2$: a 2 L stirred Parr bench-scale reactor was used. The reactor was equipped with a mechanical stir capable of stirring to 1200 rpm. The jacketed reactor had a temperature control system to maintain the reactor temperature between 30 to 100° C. The reactor was equipped with a triple blade metal stirrer, baffles and pressurized to 5 psi nitrogen. The reactor was then charged with a 1M solution of dibutyl magnesium in heptane (417.5 mL, 417.5 mmol), diisoamyl ether (31.9 g, 201.2 mmol) and anhydrous heptane (275 mL). Stirring was started at 1191 rpm. Next, 2-methyl-2-chloropropane (115.7 g, 1250 mmol) in anhydrous heptane (125 mL) was added via syringe pump at a constant rate over 7 hours. After the addition was complete the mixture was stirred at 1191 rpm overnight. The white mixture was transferred out of the reactor to a glass vessel where the mother liquor was decanted and the remaining white solids were washed six times with pentane and dried to 300 mTorr via vacuum. Yield=50.465 g. A scanning electron micrograph (SEM) of the magnesium support is provided in FIG. 1. FIG. 1 shows that the magnesium chloride support particles have a spheroidal shape. The magnesium chloride support particles have an average diameter in the range of 20 μm to 30 μm and a Dm/Dn value of 1.07 with Dm=28.4 μM and Dn=26.6.

For the MgCl$_2$ support particles, both the mass average diameter Dm (by SEM) and the "relative" mass average diameter Dm* (by stereomicroscope) were obtained to provide a comparison of the methods. Based on SEM, 347 particles were counted. They were divided into 7 different classes with 5 micron intervals from 15 to 50 microns. Dm and Dn were calculated based on data in the Table 1A below.

TABLE 1A

| Diameter in microns (μm) | Lower limit in microns (μm) | Upper limit in microns (μm) | Count |
|---|---|---|---|
| 17.5 | 15 | 20 | 18 |
| 22.5 | 20 | 25 | 89 |
| 27.5 | 25 | 30 | 189 |
| 32.5 | 30 | 35 | 42 |
| 37.5 | 35 | 40 | 8 |
| 42.5 | 40 | 45 | 1 |
| 47.5 | 45 | 50 | 0 |

Dm = 28.4 micron and Dn = 26.6 micron. Dm/Dn = 1.07

The picture obtained from the stereomicroscope showing the dense and spheroidal particles was enlarged for easy counting, so the units of Dm* are arbitrary and have no real meaning; the Dm* is a relative mass average diameter. Nevertheless, the particle size distribution characterized by Dm*/Dn showed similar results to the particle size distribution characterized as Dm/Dn and determined by SEM. With the stereomicroscope, a total of 166 particles were counted and Dm*/Dn=1.05. The particle size classes in Table 1B represent different size categories for the counted particles.

TABLE 1B

| Particles Size Class | Total | size (mm) |
|---|---|---|
| Class 1 | 132 | 10 |
| Class 2 | 24 | 8 |
| Class 3 | 2 | 6 |
| Class 4 | 4 | 12 |
| Class 5 | 4 | 15 |

Thermogravimetric analysis (TGA) showed that the spheroidal $MgCl_2$ support contained 9.9% by weight of the diisoamyl ether compound.

Figure 2:
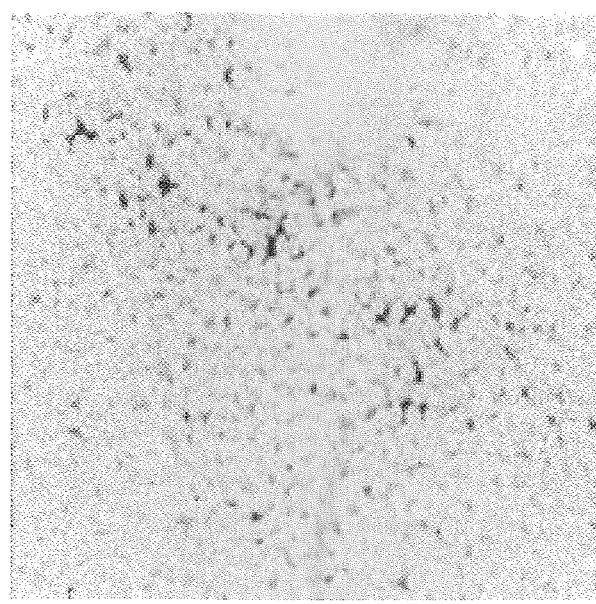
FIG. 2 shows a stereomicroscope picture of $MgCl_2$ support particles after heat treatment.

Ether Removal Method A) To remove the diisoamyl ether from the magnesium chloride support, the support was heated in a Schlenk flask under nitrogen at 120° C. for 3 hours and until the final vacuum reading was 200 mTorr of vacuum. The amount of ether remaining in the $MgCl_2$ support after heat treatment (in weight percent by weight of support) was calculated by thermogravimetric analysis (TGA) and is shown in Table 2. A picture of the magnesium support particles shows that good spheroidal morphology is well maintained after the ether removal step (see FIG. 2).

Ether Removal Method B) Alternatively, the ether could be removed by treating the spheroidal $MgCl_2$ support with diethylaluminum chloride ($Et_2AlCl$ or "DEAC"). The ether could be reduced to below 1.5 weight percent when a molar ratio of Al to ether of 5 to 1 was used. To treat the $MgCl_2$, a solution of diethylaluminum chloride was added to the solid support and the mixture was agitated for 12 hrs. The amount of ether remaining in the $MgCl_2$ support after $Et_2AlCl$ (in weight percent by weight of support) was calculated by thermogravimetric analysis (TGA) and is shown in Table 2. It was found that diethylaluminum chloride was more effective at reducing the amount of ether present in the $MgCl_2$ support than was triethylaluminum (TEAL) under similar treatment conditions. Compare catalyst 3, where 2 weight % of the diisoamyl ether remains in the $MgCl_2$ support, with inventive catalyst 1B, where 1.2 weight % of diisoamyl ether remains in the $MgCl_2$ support (see Table 2).

Preparation of Polymerization Catalysts (Supporting Phosphinimine Catalyst and Cocatalyst on $MgCl_2$)

Each catalyst was prepared targeting a final formulation having 0.03 mmol titanium per gram of catalyst, a molar ratio of Al (from MAO) to titanium of 45:1 (except that for the catalyst 3 where the target was Al/Ti=15:1), and a molar ratio of magnesium to titanium of about 350:1. The polymerization catalyst particles were examined using a stereomicroscope.

Figure 3A:
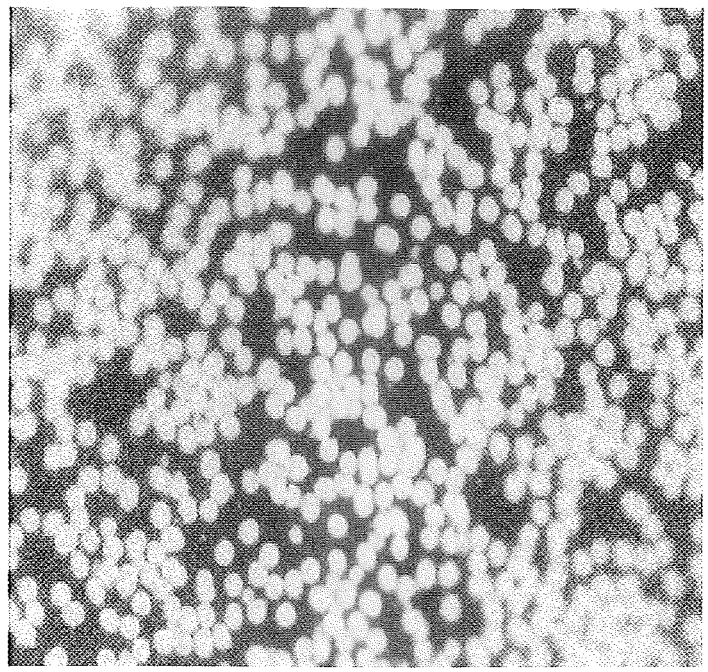
FIG. 3A shows a stereomicroscope picture of olefin polymerization catalyst particles made according to the present disclosure.

Catalyst 1A) 9.11 mg of the phosphinimine catalyst compound, (1,2-(n-propyl)($C_6F_5$)Cp)Ti(N=P(t-Bu)$_3$)$Cl_2$ was combined with 0.402 g of a 10 wt % MAO solution in a hypovial. A stir bar was added and the mixture was stirred for 30 minutes. The phosphinimine catalyst/MAO solution was then added to 0.498 g of the $MgCl_2$ support prepared as above and using method A to remove the ether (and which $MgCl_2$ was slurried in toluene). The hypovial was shaken overnight and the contents were filtered on a filter frit and washed twice with toluene and three times with pentane and then dried to <500 mTorr. The resulting catalyst had a Dm*=9.06, a Dn=8.81 and a Dm*/Dn=1.03. FIG. 3A, which is an expanded image obtained from stereomicroscopy confirms that the polymerization catalyst was comprised of particles having a spheroidal shape.

Figure 3B:
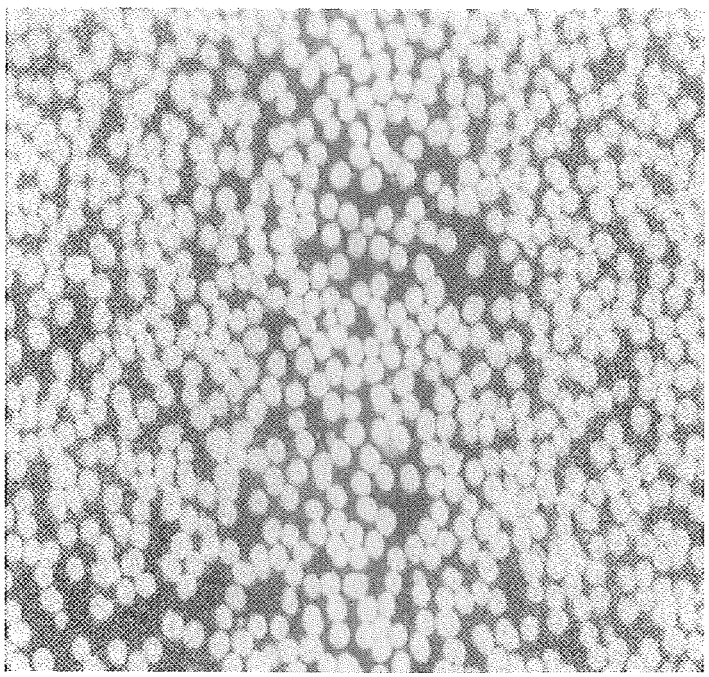
FIG. 3B shows a stereomicroscope picture of olefin polymerization catalyst particles made according to the present disclosure.

Catalyst 1B) This catalyst was prepared similarly to catalyst 1A except that method B was used to remove the ether from the $MgCl_2$ support. The resulting catalyst had a Dm*=7.19, a Dn=7.08 and a Dm*/Dn=1.02. FIG. 3B, which is an expanded image obtained from stereomicroscopy confirms that the polymerization catalyst was comprised of particles having a spheroidal shape.

Figure 4A:
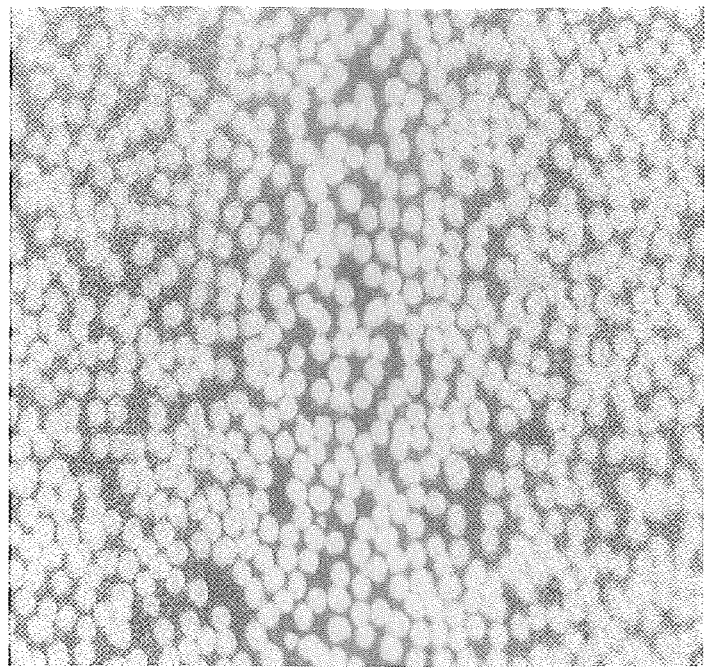
FIG. 4A shows a stereomicroscope picture of olefin polymerization catalyst particles made according to the present disclosure.

Catalyst 2A) 9.42 mg of the phosphinimine catalyst compound, (1-$C_6F_5CH_2$-Indenyl)((t-Bu)$_3$P=N)Ti$Cl_2$ was combined with 0.404 g of a 10 wt % MAO solution in a hypovial. A stir bar was added and the mixture was stirred for 30 minutes. The phosphinimine catalyst/MAO solution was then added to 0.502 g of the $MgCl_2$ support prepared as above and using method A to remove the ether (and which $MgCl_2$ was slurried in toluene). The hypovial was shaken overnight and the contents were filtered on a filter frit and washed twice with toluene and three times with pentane and then dried to <500 mTorr. The resulting catalyst had a Dm*=9.29, a Dn=8.81 and a Dm*/Dn=1.06. FIG. 4A, which is an expanded image obtained from stereomicroscopy confirms that the polymerization catalyst was comprised of particles having a spheroidal shape.

Figure 4B:
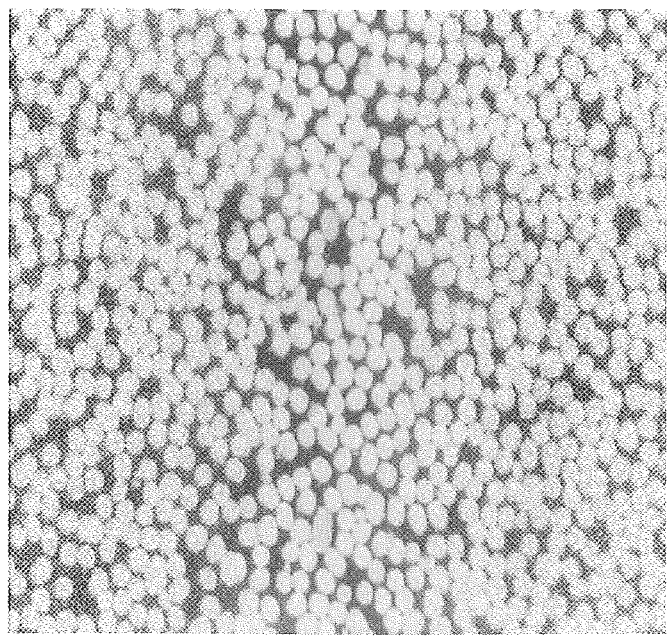
FIG. 4B shows a stereomicroscope picture of olefin polymerization catalyst particles made according to the present disclosure.

Catalyst 2B) This catalyst was prepared similarly to catalyst 2A except that method B was used to remove the ether from the $MgCl_2$ support. The resulting catalyst had a Dm*=9.036, a Dn=8.81 and a Dm*/Dn=1.03. FIG. 4B, which is an expanded image obtained from stereomicroscopy confirms that the polymerization catalyst was comprised of particles having a spheroidal shape.

Catalyst 3) This catalyst was prepared similarly to catalyst 1B except that triethylaluminum (TEAL) was used to remove the ether from the $MgCl_2$ support instead of diethylaluminum chloride (DEAC).

Some details of the olefin polymerization catalysts are provided in Table 2. Note that the $MgCl_2$ supports having less than about 2 weight % of ether present, lead to improved catalyst loading on to the support as indicated by the titanium % by weight of the final catalyst. Below about 2 wt % of ether, the weight percent of the phosphinimine catalyst ending up on the support is always above about 50 wt %. Hence, reduction or removal of the ether compound from the spheroidal magnesium support, once formed, appears to be important for achieving significant loading of a phosphinimine type catalyst compound onto a spheroidal $MgCl_2$ support.

TABLE 2

Catalyst Composition

| Phosphinimine Catalyst Molecule | The MgCl$_2$ Support | | The Final Catalyst Composition | | |
|---|---|---|---|---|---|
| | Ether Removal Method | Weight % of Ether Present after Treatment (by TGA) | mmol of Ti/g catalyst | Total Ti (wt % of total catalyst) | (Final wt % of Phosphinimine Catalyst on the support) |
| 1A, (1,2-(n-propyl)(C$_6$F$_5$)Cp)Ti(N=P(t-Bu)$_3$)Cl$_2$ | Heat | 0.075 | 0.017 | 0.083 | 56 |
| 1B, (1,2-(n-propyl)(C$_6$F$_5$)Cp)Ti(N=P(t-Bu)$_3$)Cl$_2$ | Et$_2$AlCl | 1.2 | 0.021 | 0.102 | 71 |
| 2A, (1-C$_6$F$_5$CH$_2$-Indenyl)((t-Bu)$_3$P=N)TiCl$_2$ | Heat | 0.075 | 0.024 | 0.113 | 77 |
| 2B C$_6$F$_5$CH$_2$-Indenyl)((t-Bu)$_3$P=N)TiCl$_2$ | Et$_2$AlCl | 1.2 | 0.021 | 0.115 | 80 |
| 3, (1,2-(n-propyl)(C$_6$F$_5$)Cp)Ti(N=P(t-Bu)$_3$)Cl$_2$ | TEAL | 2.0 | 0.013 | 0.064 | 44 |

For comparison purposes the phosphinimine catalyst molecules used to make inventive catalysts 1A or 1B and 2A or 2B were also supported on silica. For a general preparation of the silica supported comparative catalyst 4 which is based on phosphinimine catalyst compound (1,2-(n-propyl)(C$_6$F$_5$)Cp)Ti(N=P(t-Bu)$_3$)Cl$_2$ see U.S. Pat. Appl. Pub. No. 2013/0345377. For a general preparation of the silica supported comparative catalyst 5 which is based on phosphinimine catalyst compound (1-C$_6$F$_5$CH$_2$-Indenyl)((t-Bu)$_3$P=N)TiCl$_2$ see U.S. Pat. Appl. Pub. No. 2013/0345377.

Polymerization

The Bench Scale Reactor (BSR) was a 2 liter autoclave semi batch reactor operating in the gas phase at 88° C. at 300 psig of total operating pressure. 1.0 mL of a 25 wt % solution of triisobutylaluminum (TIBAL) in heptane was used as an impurity scavenger prior to introduction of ethylene. Catalyst delivery and polymer removal were in batch mode, and all feed-streams delivery was continuous. The reactor was equipped with impeller stirrers that spin at 525 rpm to provide reactor mixing. The BSR was equipped with a process Gas Chromatograph that continuously measures the reactor headspace composition. A syringe pump delivered 1-hexene to the reactor and all other feed-streams were delivered via mass flow indicating controllers. The feed-streams responded to inputs from the master controller in a closed loop control system to maintain reaction set-points. Feed-stream control utilized cascaded proportional-integral-derivative (i.e. PID) loops for each of the reactor reagents (ethylene, 1-hexene, hydrogen and nitrogen). The operator entered the target mole % of each reagent into the Human Machine Interface. These values were what the primary or master loop utilized as the process set-point target and this was what the unit monitored via the feedback from the process GC analysis. The cascaded (slave) loop interpreted the output from the master loop as a molar ratio of the reagent concentration divided by ethylene concentration. This reagent molar ratio varied during the reaction in relation to the GC analysis output concentrations in the master loop and thereby maintained reagent set-points in the master loop. Pressure control of the reactor was done by the use of a single PID loop where input to the loop was in the form of the observed reactor pressure. The loop output controlled the flow of only ethylene to the reactor to maintain the set pressure. As described above, all of the other reaction components are fed in ratio to the ethylene and are therefore subject to the constraints of pressure control.

General Conditions: The reactor was heated at 100° C. for 1 hour and thoroughly purged with nitrogen. A polymerization catalyst (prepared as above) was loaded into a catalyst injection tube in an inert atmosphere glove box. The catalyst injection tube was attached to the reactor, and the reactor was purged once with ethylene and four times with nitrogen. Ethylene partial pressure was maintained at 50 mol % in the reactor. 1-Hexene partial pressure was maintained at 0.8 mol %. Hydrogen flow was adjusted to the ethylene flow such that the partial pressure was maintained at approximately 0.025 mol % and the balance of the reactor mixture (approximately 49 mol %) was nitrogen. The run was continued for 60 minutes, before the ethylene flow was stopped. Cooling water was turned on and the ethylene was slowly vented from the reactor. The reactor was then purged with nitrogen. The reactor was then opened so that the reactor contents, the reactor appearance and the polymer could be observed. The polymer was removed and then weighed. Polymer data are provided in Table 3 and FIGS. 5A, 5B, 6A, 6B, 7 and 8.

TABLE 3

Polymer Properties

| | Poly. Run No. | | | | | |
|---|---|---|---|---|---|---|
| | 1 | 2 | 3 | 4 | 5 | 6 |
| Catalyst | 1A | 1B | 2A | 2B | Comp. 4 | Comp. 5 |
| Polymer Morphology | Spheroidal FIG. 5A | Spheroidal FIG. 5B | Spheroidal FIG. 6A | Spheroidal FIG. 6B | Irregular FIG. 7 | Irregular FIG. 8 |
| Dm*/Dn | — | 1.05 | 1.03 | — | — | — |
| Density (g/cc) | 0.9111 | 0.9107 | 0.9166 | 0.9238 | 0.9152 | 0.9182 |
| $I_2$ (g/10 min) | 1.01 | 1.06 | 0.44 | 0.37 | 1.44 | 0.66 |
| $I_{21}$ | 17.3 | 23.2 | 16 | 21.4 | 24.7 | 22.8 |
| $I_{21}/I_2$ | 17.2 | 22 | 36.2 | 59 | 17.1 | 35.9 |

TABLE 3-continued

Polymer Properties

| | Poly. Run No. | | | | | |
|---|---|---|---|---|---|---|
| | 1 | 2 | 3 | 4 | 5 | 6 |
| $CDBI_{50}$ (wt %) | 75.2 | 71.2 | 67.6 | 54.5 | 70 | 63 |
| TREF (90-105° C., wt %) | 2.3 | 6.9 | 4.7 | 19.9 | 5.8 | 11.1 |
| Mn | 52889 | 51517 | 47091 | 35979 | 46138 | 35691 |
| Mw | 100059 | 117526 | 102959 | 186200 | 87748 | 89012 |
| Mz | 169597 | 635217 | 199260 | 1629317 | 144899 | 181182 |
| Mw/Mn | 1.89 | 2.29 | 2.18 | 5.18 | 1.9 | 2.49 |
| mole % of C6 | 8.2 | 9.3 | 7.3 | 5.8 | 7.1 | 6.8 |
| wt % of C6 | 2.9 | 3.3 | 2 | 2 | 2.5 | 2.4 |
| Comonomer | 1-hexene | 1-hexene | 1-hexene | 1-hexene | 1-hexene | 1-hexene |
| Comonomer Profile (GPC-FTIR) | normal | normal | normal | partially reversed | normal | reverse |
| Peak Melting Temperature (° C.) | 109.2 | 99.4 | 115.1 | 121.8 | 113.7 | 118.4 |
| % Crystallinity | 37.4 | 35.5 | 41.5 | 48.9 | 41.2 | 44.1 |

Figure 5A:
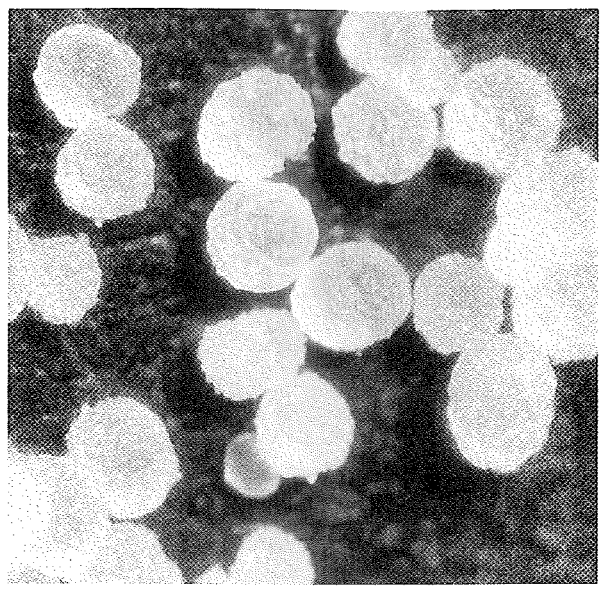
FIG. 5A shows a stereomicroscope picture of ethylene copolymer particles made according to the present disclosure.
Figure 5B:
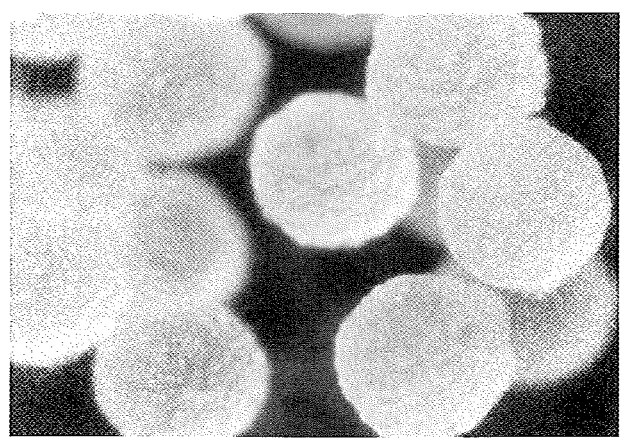
FIG. 5B shows a stereomicroscope picture of ethylene copolymer particles made according to the present disclosure.
Figure 6A:
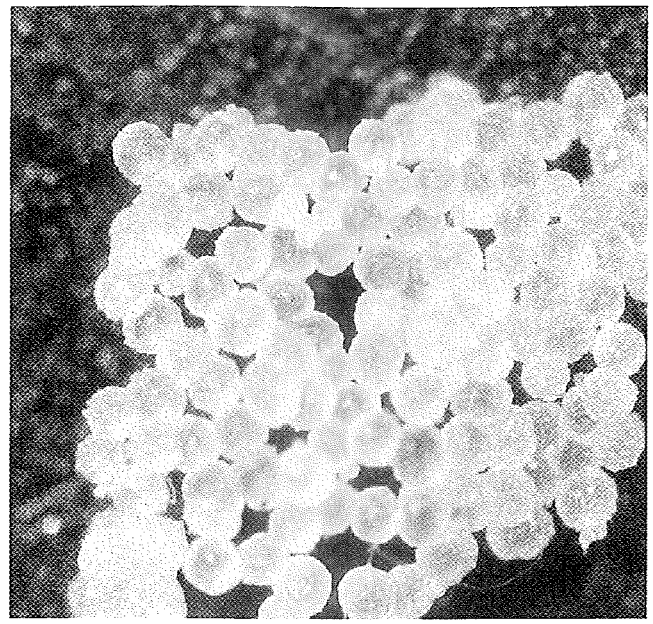
FIG. 6A shows a stereomicroscope picture of ethylene copolymer particles made according to the present disclosure.
Figure 6B:
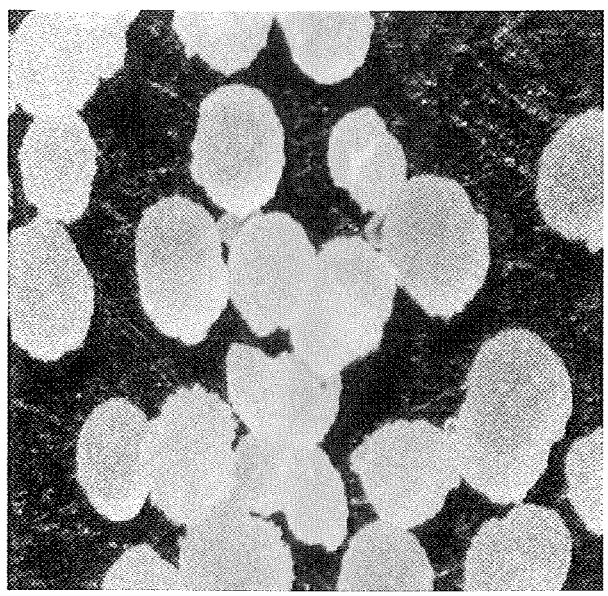
FIG. 6B shows a stereomicroscope picture of ethylene copolymer particles made according to the present disclosure.

As shown in FIGS. 5A and 5B, spheroidal catalysts 1A and 1B give rise to spheroidal polymer particle morphology respectively. Spheroidal catalyst 2A also gives rise to highly spheroidal and uniform polymer particles as shown in FIG. 6A, while catalyst 2B, although providing polymer particles with good morphology, gives a slightly less spheroidal polymer particle (see FIG. 6B).

Figure 7:
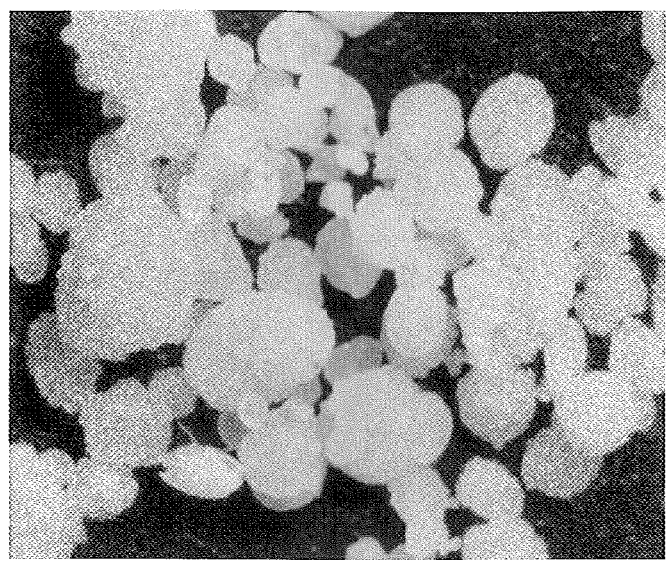
FIG. 7 shows a stereomicroscope picture of ethylene copolymer particles made according to a comparative example.
Figure 8:
FIG. 8 shows a stereomicroscope picture of ethylene copolymer particles made according to a comparative example.

All of the inventive catalysts 1A, 1B, 2A, and 2B, give polymer particles having much more uniform and more spheroidal morphology than do either of the comparative catalysts 4 or 5: compare and contrast FIGS. 5A-6B with FIGS. 7 and 8.

Thus the polymer particles produced using phosphinimine catalysts made according to the present disclosure (catalysts 1A, 1B, and 2A, 2B, which are supported on spheroidal magnesium chloride which does not have significant amounts of an electron donor compound present) are much more spheroidal and hence have much better morphology then the polymer particles produced using comparative catalysts 4 and 5 (which are supported on silica). Furthermore, the polymer particles produced in the present disclosure are spheroidal and have good morphology and uniformity, despite the absence of a pre-polymerization step. This marks an improvement over other catalyst systems which require an initial pre-polymerization step to obtain good polymer morphology.

INDUSTRIAL APPLICABILITY

The present disclosure is directed to the use of solid, spheroidal olefin polymerization catalysts for the polymerization of ethylene with at least one alpha-olefin comonomer. The catalyst polymerizes ethylene optionally with one or more alpha-olefins to give an ethylene (co)polymer having improved morphology and bulk density. Production of polyethylene copolymers having improved morphology and bulk density is desirable in commercial scale gas phase polymerization processes such as those which take place in fluidized bed polymerization reactors.

The invention claimed is:

1. A spheroidal olefin polymerization catalyst having a particle size distribution characterized by a Dm*/Dn of less than 3.0, wherein said catalyst comprises: a phosphinimine catalyst, a cocatalyst, and a spheroidal magnesium chloride support, wherein the magnesium chloride support comprises particles with a mass average diameter Dm from about 5 to about 100 μm, a particle size distribution characterized by a Dm/Dn of less than 3.0, and comprises less than 2% by weight of an electron donor compound.

2. The spheroidal olefin polymerization catalyst of claim 1, wherein the electron donor compound is a non-protic ether.

3. The spheroidal olefin polymerization catalyst of claim 1, wherein the magnesium chloride support comprises particles with a mass average diameter of from about 5 to about 50 μm.

4. The spheroidal olefin polymerization catalyst of claim 1, wherein the magnesium chloride support comprises less than 1.5% by weight of an electron donor compound.

5. The spheroidal olefin polymerization catalyst of claim 1 having a particle size distribution characterized by a Dm*/Dn of less than 2.0.

6. The spheroidal olefin polymerization catalyst of claim 1 having a particle size distribution characterized by a Dm*/Dn of less than 1.5.

7. The spheroidal olefin polymerization catalyst of claim 1, wherein the magnesium chloride support comprises particles with a particle size distribution characterized by a Dm/Dn of less than 2.0.

8. The spheroidal olefin polymerization catalyst of claim 1 wherein the phosphinimine catalyst has the formula: (L)(PI)MX$_2$, where M is Ti, Zr or Hf; PI is a phosphinimine ligand having the formula R$_3$P=N—, where R is independently selected from the group consisting of hydrogen, halogen, and C$_1$-C$_{20}$ hydrocarbyl; L is a ligand selected from the group, consisting of cyclopentadienyl, substituted cyclopentadienyl, indenyl, substituted indenyl, fluorenyl, and substituted fluorenyl; and X is an activatable ligand.

9. The spheroidal olefin polymerization catalyst of claim 1 wherein the phosphinimine catalyst has the formula: (L)((t-Bu)$_3$P=N)TiX$_2$, where L is a cyclopentadienyl ligand, a substituted cyclopentadienyl ligand, an indenyl ligand, or a substituted indenyl ligand; and X is an activatable ligand.

10. The spheroidal olefin polymerization catalyst of claim 1 wherein the phosphinimine catalyst has the formula:

(L)((t-Bu)$_3$P═N)TiX$_2$, where L is a substituted cyclopentadienyl ligand, or a substituted indenyl ligand; and X is an activatable ligand.

11. The spheroidal olefin polymerization catalyst of claim 1 wherein the cocatalyst is selected from the group consisting of ionic activators, alkylaluminoxanes and mixtures thereof.

12. A process for polymerizing ethylene and at least one alpha-olefin to produce an ethylene copolymer, said process comprising contacting a spheroidal olefin polymerization catalyst with ethylene and at least one alpha-olefin in a polymerization reactor, wherein said spheroidal olefin polymerization catalyst has a particle size distribution characterized by a Dm*/Dn of less than 3.0 and comprises: a phosphinimine catalyst, a cocatalyst, and a spheroidal magnesium chloride support; wherein the magnesium chloride support comprises particles with a mass average diameter Dm from about 5 to about 100 μm, a particle size distribution characterized by a Dm/Dn of less than 3.0, and comprises less than 2% by weight of an electron donor compound.

13. The process of claim 12 wherein the phosphinimine catalyst has the formula: (L)(PI)MX$_2$, where M is Ti, Zr or Hf; PI is a phosphinimine ligand having the formula R$_3$P═N—, where R is independently selected from the group consisting of hydrogen, halogen, and C$_1$-C$_{20}$ hydrocarbyl; L is a ligand selected from the group consisting of cyclopentadienyl, substituted cyclopentadienyl, indenyl, substituted indenyl, fluorenyl, and substituted fluorenyl; and X is an activatable ligand.

14. The process of claim 12 wherein the phosphinimine catalyst has the formula: (L)((t-Bu)$_3$P═N)TiX$_2$, where L is a cyclopentadienyl ligand, a substituted cyclopentadienyl ligand, an indenyl ligand, or a substituted indenyl ligand; and X is an activatable ligand.

15. The process of claim 12 wherein the phosphinimine catalyst has the formula: (L)((t-Bu)$_3$P═N)TiX$_2$, where L is a substituted cyclopentadienyl ligand, or a substituted indenyl ligand; and X is an activatable ligand.

16. The process of claim 12 wherein the cocatalyst is selected from the group consisting of ionic activators, alkylaluminoxanes and mixtures thereof.

* * * * *